United States Patent
Ellison et al.

(10) Patent No.: US 7,546,248 B2
(45) Date of Patent: Jun. 9, 2009

(54) SALES MANAGEMENT SYSTEM AND METHOD

(75) Inventors: Allan Ellison, Northbrook, IL (US); Albert Lencioni, Buffalo Grove, IL (US); Lawrence Franz, Tinley Park, IL (US); Jean Franz, Tinley Park, IL (US); Lawrence Franz, legal representative, Tinley Park, IL (US); Paul Willarson, Chicago, IL (US)

(73) Assignee: ASA Sales Systems, LLC, Chicago, IL (US)

( * ) Notice: Subject to any disclaimer, the term of this patent is extended or adjusted under 35 U.S.C. 154(b) by 482 days.

(21) Appl. No.: 11/063,749

(22) Filed: Feb. 24, 2005

(65) Prior Publication Data

US 2005/0192831 A1 Sep. 1, 2005

Related U.S. Application Data

(60) Provisional application No. 60/547,241, filed on Feb. 24, 2004.

(51) Int. Cl.
*G06F 11/34* (2006.01)
(52) U.S. Cl. .................. 705/11; 705/1; 705/10; 705/21; 705/26; 701/1
(58) Field of Classification Search ............ 705/10, 705/26, 21, 1, 11; 707/1
See application file for complete search history.

(56) References Cited

U.S. PATENT DOCUMENTS

| | | | | |
|---|---|---|---|---|
| 6,067,525 | A * | 5/2000 | Johnson et al. | 705/10 |
| 7,216,087 | B2* | 5/2007 | Thompson et al. | 705/10 |
| 2005/0177535 | A1* | 8/2005 | Song | 707/1 |
| 2006/0031130 | A1* | 2/2006 | Todd | 705/26 |
| 2007/0094086 | A1* | 4/2007 | Ikezawa et al. | 705/21 |

OTHER PUBLICATIONS

Hughes, G. David (Jan. 1984); "How to Analyze Sales Performance" Business Computer Systems, 3(1), 17; Retrieved Jan. 4, 2008, from ABI/Inform Global database ;(Document ID: 962655) from proquest database online.*

To Enhance Productivity; Rural Telecommunications, 6(2), 59; Retrieved Jan. 4, 2008, from ABI/Inform Global database, (Document ID: 776092) from proquest database online.*

* cited by examiner

*Primary Examiner*—Yogesh C Garg
(74) *Attorney, Agent, or Firm*—Nixon & Vanderhye P.C.

(57) ABSTRACT

A method and system facilitates management of sales activities of sales associates. Sales information from a remote computer is received by a server computer. The server computer processes the sales information, and the system identifies weaknesses of the sales associates based on the sales information. Once a weakness is identified, the system further identifies advice content based on the identified weaknesses of the sales associates. In one component, the system utilizes an activity curve, which tracks aggregate sales information through the sales cycle. The advice content may be determined based on a shape of the activity curve.

15 Claims, 24 Drawing Sheets

| Edit | ! | Company | Val Level | First Mtg | Offering | Dollars | Milestones | | | Next Mtg |
|------|---|---------|-----------|-----------|----------|---------|---|---|---|----------|
| ⇧ | | Alejandro Company | | 2/1/05 | | | | | | 2/24/05 |
| ⇧ | | BIL Company | 6 | 12/21/04 | Demo Offering 04 | | Person | Need | Money | 2/18/05 |
| ⇧ | | CHD Company | 2 | 1/31/05 | Demo Offering 04 | | Person | Need | Money | 2/17/05 |
| ⇧ | | CHG Company | 4 | 2/2/05 | | | Person | Need | Money | 2/18/05 |
| ⇧ | | HGF Company | 5 | 1/26/05 | Demo Offering 06 | | Person | Need | Money | 2/25/05 |
| ⇧ | | HJJ Company | 4 | 1/13/05 | Demo Offering 10 | 155000 | Person | Need | Money | 1/31/05 |
| ⇧ | | NDF Company | 3 | 2/7/05 | Demo Offering 06 | | Person | Need | Money | 2/14/05 |
| ⇧ | | TMI Company | 4 | 1/11/05 | Demo Offering 09 | | Person | Need | Money | 2/11/05 |

Key: ! = Missed first meeting   Y = yellow border on board   R = red border on board M-Power — Information Phase / Jill Frey Print

M-Power

Information Phase / Frank Belli

Key: ! = Missed first meeting  Y = yellow border on board  R = red border on board

| Edit | ! | Company | Val Level | First Mtg | Offering | Dollars | Milestones | | | | Next Mtg |
|---|---|---|---|---|---|---|---|---|---|---|---|
| ⇧ | | ASD Company | 2 | 10/11/04 | Demo Offering 05 | 23000 | Person | Need | Money | Time | 1/11/05 |
| ⇧ | | Chuck Inc. | 4 | 12/20/04 | Demo Offering 08 | 55000 | Person | Need | Money | Time | 12/23/04 |
| ⇧ | | PLF Company | 6 | 5/13/04 | Demo Offe | | | | Money | Time | 1/10/05 |
| ⇧ | R | PLU Company | 3 | 11/8/04 | Demo Offe | | | | Money | Time | 1/11/05 |
| ⇧ | | SDF Company | 6 | 12/20/04 | Demo Offe | | | | Money | Time | 12/29/04 |

SDF Company
Money

☑ Pricing has been agreed upon by contact
☑ Working within prospect budgeting process
☐ Contact willing to divert funding to your solution Criteria Listing

Analysis for Funnel Configuration #1 (Top of Window)

```
M Power - Microsoft Internet Explorer                              _ □ X

M-Power                                                    Print
                    Analysis / Vincent Belli ┌─────────────────────────────────────────────────────────────┐
 │ Rating: 5  Tenure Level: Experienced                        │
 │                                                             │
 │ Show:  ☑ Analysis  ☑ Questions  ☑ Actions                   │
 └─────────────────────────────────────────────────────────────┘

Analysis

1. Low likelihood of reaching goals.
  2. Insufficient number of scheduled First Meetings.
  3. Inadequate prospecting activity.
  4. Funnel has room for growth.
  5. The salesperson may not have a realistic opinion of all Information Phase prospects.
  6. Salesperson may not be establishing First Meetings at appropriate prospect decision-making levels.
  7. Quantity of sales effort must improve Questions Are you meeting with the decision maker(s)?
  1. How did you identify your initial contact?
  2. Was your initial call high enough into the prospect organization?
  3. Whom are you meeting with?
  4. Are you currently working higher in the prospect organization than your original contact?
  5. How have you determined that you are dealing with the decision maker(s)?
  6. What is/are their title(s)?
  7. Do these titles typically represent buyers of our product/service?
  8. Does your primary contact have the support of upper management?
  9. What are the prospect's decision criteria?
 10. How is your highest-level contact directly impacted by this sale?
 11. Talked to Buyer
 12. Talked to Maintenance Does the prospect need our solution?
 13. Why did the contact agree to meet with you?
 14. How did you qualify the opportunity?
 15. How did you determine that we can fill the proispect's need(s)?
 16. From the prospect's perspective, will anything cause this problem to "go away"?
 17. Are your discussions focusing on our "standard" products, or are you attempting to customize a
     solution?
 18. Do any internal roadblocks exist which prevent you from delivering a proposal?
 19. Who and what are we competing against?
 20. When did we come into the purchase process in comparison to our competition?
```

FIG.18

Analysis for Configuration #1 (Bottom of Window)

```
M Power - Microsoft Internet Explorer
```

24. How did the prospect react to the price?
25. Is the ROI acceptable to the prospect?
26. Is our internal pricing process causing you delays?
27. Are you attempting to gain internal approval for "special" pricing?
28. Need for Financing
29. Need our help for financing
30. How many IT contractors does your company use at any given time?
31. What is the average bill rate for a contractor?

Are the decision and implementation timeframes acceptable?

32. How much time has passed since our most recent meeting with the prospect regarding this opportunity?
33. What are you planning to accomplish during the next meeting?
34. Have "Information Phase" meetings been regularly delayed?
35. When does the prospect want to begin using our product/service?
36. What steps are involved in facilitating product/service delivery?
37. Why will the prospect make purchase and implementation decisions within our normal sales cycle?

Actions

1. Minimal supervision required.
2. Minimal to moderate supervision required.
3. Moderate supervision required.
4. Verify that salesperson is not "waiting for the phone to ring."
5. Remove all barriers to prospecting.
6. Verify that First Meetings were scheduled to discuss specific business opportunities, and not merely "networking" sessions.
7. Remove First Meetings of the "networking" variety from the board.
8. Drive additional prospecting.
9. Gain commitment to maintain or increase prospecting.
10. Set specific dates to accompany salesperson on First Meeting appointments.
11. Attend First Meetings to qualify opportunities.
12. Opportunity analysis involves verifying key data.
13. Opportunity analysis involves validating Decision Point milestones, as well as focusing upon timeframes and strategies for opportunity closure.
14. Opportunity analysis involves a "back to basics" approach, validating all prospect information.
15. Verify understanding of product/service ROI and prospect applicability.
16. Focus upon quality issues associated with each sale. Ensure understanding of Decision Point milestones, and the normal sales cycle.
17. Remove Decision Point opportunities from column that don't meet criteria.
18. Remove Decision Point opportunities that have little or no chance of moving to Closed.
19. Correct any internal roadblocks keeping salesperson from presenting proposals.
20. Devote resources to moving Decision Point opportunities to Closed.
21. Personally involve yourself in attempting to close Decision Point opportunities.
22. Work on "time management" issues to allow salesperson a balanced approach to all phases of the sales cycle.
23. Maintain this pattern to help ensure consistent future success.

FIG.19

Analysis for Configuration #2 (Top of Window)

M-Power

Analysis / James Smith

Rating: 8  Tenure Level: Experienced

Show: ☑ Analysis  ☑ Questions  ☑ Actions

Analysis

1. Very high likelihood of reaching goals.
2. Salesperson prospecting activity consistent.
3. Salesperson able to gain next step commitment.
4. Salesperson likely working at appropriate prospect decision-making levels.
5. Salesperson likely identifying and capitalizing upon new opportunities at existing accounts.
6. Salesperson able to close a reasonable percentage of opportunities entering funnel.
7. Salesperson is closing a very high percentage of the opportunities started. This is not a natural occurrence for those prospecting regularly. There appears to be an opportunity cost associated with not seeing enough new prospects.

Questions

*Are you meeting with the decision maker(s)?*
1. Whom are you meeting with?
2. Have you met with prospect executives other than your initial contact?
3. How have you determined that you are dealing with the decision maker(s)?
4. What other prospect initiatives are being driven by your primary contact?
5. Is a committee involved in this purchase decision?
6. In your "Stalled" opportunities, have you asked for help in getting through to higher-level prospect contacts?
7. Talked to Buyer
8. Talked to Maintenance

*Does the prospect need our solution?*
9. Have you identified all potential prospect opportunities?
10. Do any internal roadblocks exist which prevent you from delivering a proposal?
11. How does the prospect organization prioritize its needs?
12. For "Stalled" opportunities, what "Need" requirements have changed?

*Can sufficient funds be allocated for our product/service?*
13. How have you determined that our sale has adequate priority to be funded?
14. Need for Financing
15. Need our help for financing
16. How many IT contractors does your company use at any given time?

FIG. 21

Analysis for Configuration #2 (Bottom of Window)

Does the prospect need our solution?
9. Have you identified all potential prospect opportunities?
10. Do any internal roadblocks exist which prevent you from delivering a proposal?
11. How does the prospect organization prioritize its needs?
12. For "Stalled" opportunities, what "Need" requirements have changed?

Can sufficient funds be allocated for our product/service?
13. How have you determined that our sale has adequate priority to be funded?
14. Need for Financing
15. Need our help for financing
16. How many IT contractors does your company use at any given time?
17. What is the average bill rate for a contractor?

Are the decision and implementation timeframes acceptable?
18. What are you planning to accomplish during the next meeting?
19. When will the prospect make a purchase decision?
20. How long will it take our organization to prepare for delivery of this product/service?
21. How long will it take the prospect's organization to prepare for delivery of this product/service?

Actions
1. Minimal supervision required.
2. Moderate to high supervision required.
3. Verify that salesperson is not "waiting for the phone to ring."
4. Drive consistent prospecting activity to avoid "ups and downs".
5. Verify that First Meetings were scheduled to discuss specific business opportunities, and not merely "networking" sessions.
6. Increase scheduled First Meeting expectation.
7. Drive consistent prospecting activity to put salesperson back on track.
8. Increase quota for First Meetings. Salesperson is demonstrating an ability to close business, and must accept more prospects into the funnel.
9. Provide internal resources to move opportunities forward.
10. Verify utilization of all internal resources to help salesperson move opportunities forward.
11. Opportunity analysis involves verifying key data.
12. Verify understanding of ROI and other product knowledge issues.
13. Focus upon quality issues associated with each sale. Ensure understanding of Decision Point milestones, and the normal sales cycle.
14. Remove Decision Point opportunities that have little or no chance of moving to Closed.
15. Correct any internal roadblocks keeping salesperson from presenting proposals.
16. Drive prospects to honor Decision and Implementation dates.
17. Accompany salesperson on calls for prospects within "Decision Point" to help close business.
18. Consider alternative salesperson career options.
19. Work on "time management" issues to allow salesperson a balanced approach to all phases of the sales cycle.
20. Utilize salesperson as a mentor or coach to others on the selling team.
21. Maintain this pattern to help ensure consistent future success.

FIG. 22

Analysis for Configuration #3 (Top of Window)

M-Power

Analysis / Kerry Marks

Rating: 4   Tenure Level: Experienced

Show:  ☑ Analysis   ☑ Questions   ☑ Actions

Analysis

1. Low likelihood of reaching goals.
2. Insufficient number of scheduled First Meetings.
3. Inadequate prospecting activity.
4. Funnel has room for growth.
5. Salesperson able to gain next step commitment.
6. Salesperson may not be establishing First Meetings at appropriate prospect decision-making levels.
7. Quantity of sales effort must improve.

Questions

Are you meeting with the decision maker(s)?
1. How are you qualifying your First Meeting contacts?
2. What is the level of your highest prospect contact?
3. How are purchase decisions of this type typically made by the prospect?
4. Will this decision be made differently? If so, how and why?
5. In your "Stalled" opportunities, have you asked for help in getting through to higher-level prospect contacts?
6. Talked to Buyer
7. Talked to Maintenance

Does the prospect need our solution?
8. Why did the contact agree to meet with you?
9. How did you uncover the prospect's problem?
10. What is the prospect's business reason behind their consideration of our product/service?
11. What has the prospect been doing about this problem since your last meeting?
12. What other options are being considered by the prospect?
13. How does the prospect see our solution as unique?
14. What is our competitive position?

Can sufficient funds be allocated for our product/service?
15. Has your primary contact expressed doubts about obtaining funding?
16. Has the prospect purchased our type of product/service in the past?
17. Do you have an agreement with the prospect on the ROI of our product/service?
18. What must we do, by when, to ensure a funding commitment?

FIG. 24

Analysis for Configuration #3 (Bottom of Window)

```
Does the prospect need our solution?
```

8. Why did the contact agree to meet with you?
9. How did you uncover the prospect's problem?
10. What is the prospect's business reason behind their consideration of our product/service?
11. What has the prospect been doing about this problem since your last meeting?
12. What other options are being considered by the prospect?
13. How does the prospect see our solution as unique?
14. What is our competitive position?

Can sufficient funds be allocated for our product/service?

15. Has your primary contact expressed doubts about obtaining funding?
16. Has the prospect purchased our type of product/service in the past?
17. Do you have an agreement with the prospect on the ROI of our product/service?
18. What must we do, by when, to ensure a funding commitment?
19. Need for Financing
20. Need our help for financing
21. How many IT contractors does your company use at any given time?
22. What is the average bill rate for a contractor?

Are the decision and implementation timeframes acceptable?

23. What are you planning to accomplish during the next meeting?
24. Why do you think the prospect will buy when you expect them to?
25. Can we deliver our product/service in an acceptable timeframe?

Actions

1. Minimal supervision required.
2. Moderate to high supervision required.
3. Gain agreement on appropriate number of concurrent, valid First Meetings.
4. This is an able salesperson who must be encouraged to work with new prospects.
5. Pre-qualify First Meetings for contact level and company type.
6. Verify utilization of all internal resources to help salesperson move opportunities forward.
7. Opportunity analysis involves verifying key data.
8. Opportunity analysis involves validating Decision Point milestones, as well as focusing upon timeframes and strategies for opportunity closure.
9. Opportunity analysis involves focusing on valid next step attainment, opportunity qualification and understanding each prospect's decision-making processes.
10. Verify that all scheduled next steps are valid, and are designed to move each sale toward closure.
11. Accompany salesperson on calls for prospects within "Information Phase" to help determine why opportunities are not progressing to the Decision Point.
12. Coach to understanding the Decision Point milestones.
13. Question the nature of Information Phase and Decision Point opportunities. With this many, there should be some Stalled.
14. Verify that salesperson is consistently asking for the order when all Decision Point milestones are met.
15. Work on "time management" issues to allow salesperson a balanced approach to all phases of the sales cycle.

FIG. 25

SALES MANAGEMENT SYSTEM AND METHOD

CROSS-REFERENCES TO RELATED APPLICATIONS

This application claims the benefit of U.S. Provisional Patent Application Ser. No. 60/547,241, filed Feb. 24, 2004, the entire content of which is herein incorporated by reference.

STATEMENT REGARDING FEDERALLY SPONSORED RESEARCH OR DEVELOPMENT (NOT APPLICABLE)

BACKGROUND OF THE INVENTION

This invention relates generally to software for managing sales information and, more particularly, to a sales management system for managing, measuring and tracking the quantity and progress of sales activity throughout a sales cycle.

While standard business practices are in place for virtually all areas of a company, including accounting, production and customer service, the sales area has historically defied the application of such methodology. This is because customer buying processes are not standardized. Therefore, a salesperson selling a single product or service likely encounters a different buying process for every potential customer with which they work. This basic reality of sales makes it difficult to objectively ascertain progress, or lack thereof, in a specific sale. The lack of customer buying standardization means that salesperson analyses of specific sales situations, as well as the potential of their sales territory, are clouded with subjective opinions about each opportunity being worked.

This issue also undermines the management aspect of sales organizations. Sales management is generally based upon subjective information, passed from salesperson to manager, regarding salesperson progress on specific sales as well as overall sales territory penetration and potential. A sales manager generally relies upon the opinions and assumptions of the sales team to determine forecasts, priorities and decisions. These are major factors in the support, strategies, tactics and staffing decisions within a sales department.

Ultimately, most sales management decisions have been made solely upon end results, instead of on a salesperson's ability to achieve progress through various "steps" of a "sales cycle," which can be defined here as a period of time from an initial substantive discussion between a salesperson and potential customer through a final decision to purchase. As a result of this focus on results, good economic times have, at times, masked the shortcomings of sales teams. An individual customer's willingness to buy may have had little to do with a salesperson undertaking the sales process with a high degree of professionalism.

Difficult economic times put a premium on sales ability and consistency of sales effort to secure new business. However, in both good and bad economic times a lack of standardized, effective sales management methodology is keeping many sales organizations from reaching their full potential. Accordingly, a need remains for an improved system and method for utilizing information related to sales activities, as opposed to just results, to assist sales managers in managing activities by their selling team related to new revenue production, generating forecasts, formulating strategic and tactical sales plans and making staffing decisions necessary for their businesses.

BRIEF SUMMARY OF THE INVENTION

A system and method for managing, measuring and tracking sales information related to sales activities that occur throughout a sales cycle and using the sales information to assist sales managers in generating forecasts, formulating strategic and tactical sales plans, and making staffing decisions is provided. Generally, the system includes a computer, which is connected to a server computer via a network system or the Internet and which is capable of exchanging files and information with the server computer.

In an exemplary embodiment of the invention, a method for managing sales activities of sales associates includes the steps of receiving sales information relating to sales activity from a remote computer, processing the sales information, identifying weaknesses of the sales associates based on the sales information. The method may further include the step of identifying advice content based on the identified weaknesses of the sales associates. The system may generate an activity curve based on the sales information of one of the sales associates. The activity curve tracks the sales information from opportunity through closing. In this context, the sales information is preferably composed of phases of a sale including first meeting phase, information phase, decision phase, and closing phase, where the activity curve is generated via a line from the first meeting phase through the closing phase. Advice content may then be identified based on a shape of the activity curve.

The method may additionally include the step of comparing expected sales activity to actual sales activity for one of the sales associates, and subsequently identifying potential or probable reasons for any deviation based on the sales information. In this context, advice content may then be identified based on the deviation reasons. The comparing step may be practiced by assigning a numeric score for each of the phases of a sale, the numeric score being indicative of sales success. For example, each phase may be assigned a numeric score from 0 to 3 based upon the following:

| Score | Meaning |
|---|---|
| 0 | Actual phase quantity = zero |
| 1 | Actual phase quantity < .66 of expected phase quantity |
| 2 | Actual phase activity >= .66 and < 1.5 of expected phase quantity |
| 3 | Actual phase quantity >= 1.5 of expected phase quantity. |

The method may further include the step of generating alerts based on the sales information. This step may be practiced by generating an alert when an actual sales cycle time exceeds a normal sales cycle time by a predetermined percentage. Alternatively or additionally, this step may be practiced by generating alerts based on a comparison of a number of opportunities in one phase to a number of opportunities in a later phase.

In another exemplary embodiment of the invention, a method for managing sales activities of sales associates includes (a) a server computer receiving sales information from a remote computer; (b) the server computer processing the sales information; and (c) generating content-based advice for individual sales associates based on respective sales information.

In still another exemplary embodiment of the invention, a sales management system includes a server computer, and a remote computer storing sales information of at least one sales associate. The remote computer is electronically connected to the server computer and communicates the sales information to the server computer. The server computer includes processing structure that processes the sales information and generates content-based advice for the at least one sales associate based on the sales information. The remote computer may be connected with the server computer via a global network.

In yet another exemplary embodiment of the invention, a computer program embodied on a computer readable medium is provided for managing sales activities of sales associates.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to the following drawings, which include drawings and exemplary screen shots therefore:

FIG. 6 illustrates an exemplary salesperson's view;

FIG. 7 illustrates an exemplary spreadsheet view;

FIG. 8 illustrates an exemplary view listing specific opportunities meeting column criteria;

FIG. 9 illustrates an exemplary edit view;

FIGS. 17-25 illustrate exemplary activity curves for different sales associates and the respective coaching reports for each;

DETAILED DESCRIPTION OF PREFERRED EMBODIMENTS

Figure 1:
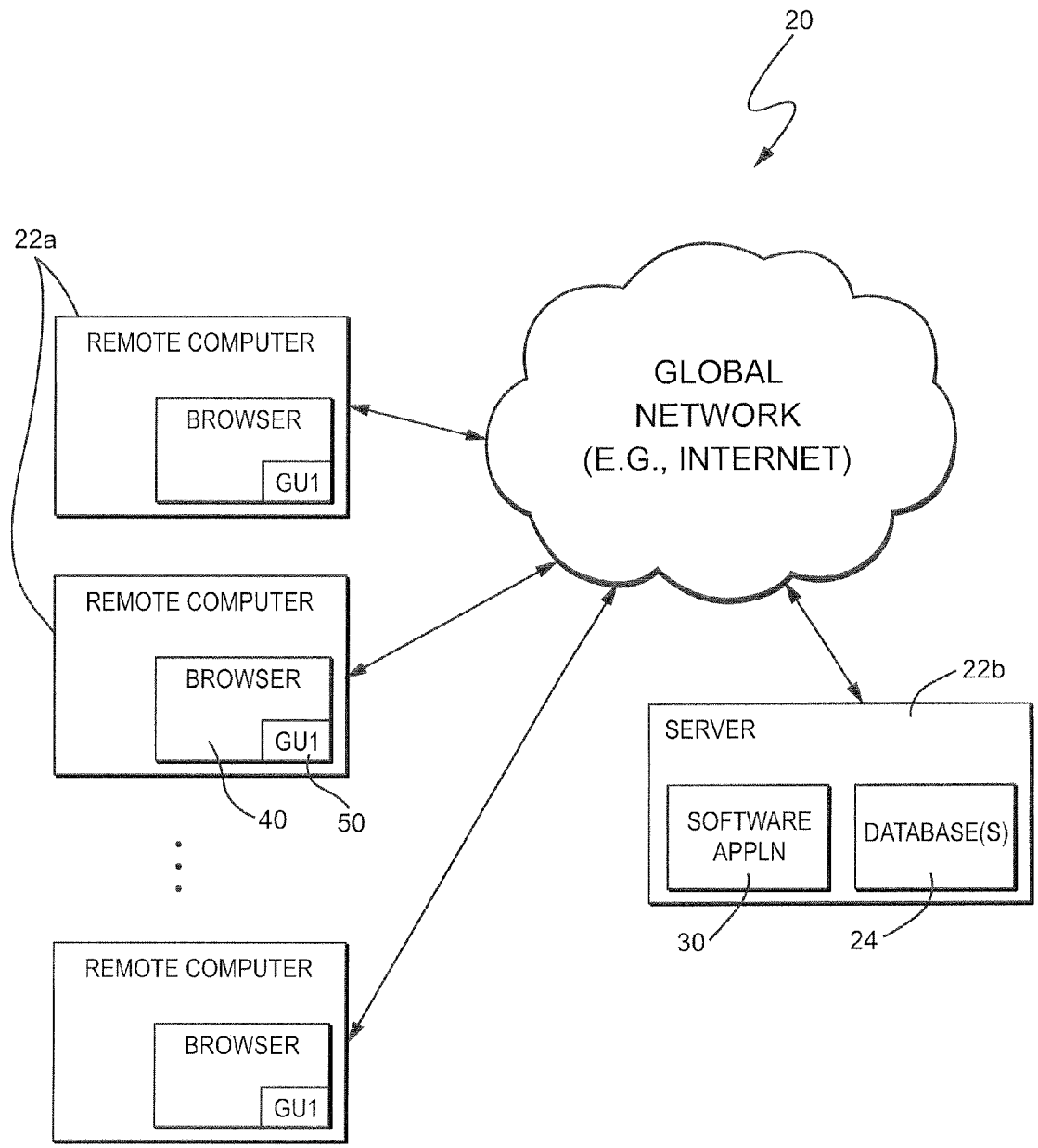
FIG. 1 is a schematic drawing of computer architecture suitable for running the management software of the present invention.

Turning now to the Figures, wherein like reference numerals refer to like elements, there is illustrated a system and method for managing and tracking sales activities. Although not required, the system and method will be described in the general context of a computer network 20 (FIG. 1), as is well known in the industry, and computer executable instructions being executed by general purpose computing devices within the computer network 20. In this regard, the general purpose computing devices may comprise one or more remote computers 22a, and one or more application server computers 22b, hosting an integrated, activity-driven sales management software application 30. The server computer 22b can also include one or more databases 24 for storing sales information, such as detailed information about sales opportunities, prospective purchasers and sales associates. "Sales information" in the context of the present invention includes all pre-sale activity. More details about the information that is stored in the databases are described in more detail below. It should be appreciated that the network components could be described as having client and server relationships, as generally known in the art.

To allow each of the remote computers 22a to access and utilize the sales management system, the software application 30 will preferably reside on the application server computer 22b. Further, it is preferable that users access the software application 30 via an internet browser 40, which acts as an interface between the software application 30 and the operating system for the remote computer 22a. Although the operating system for the local computer 22b is preferably Windows® based, it should be understood that the local computer 22b could employ any one of the currently existing operating systems, such as LINUX®, MAC OS®, Mozilla®, etc. In addition, it should be appreciated by those with skill in the art that other applications besides the browser—may also be utilized to act as an interface between the software application 30 and the remote computers 22a.

For editing, populating and maintaining the databases 24, the browser 40 includes a graphical user interface 50. The graphical user interface 50 is further comprised of various menu bars, drop-down menus, buttons and display windows.

As will be appreciated by those of skill in the art, the computers 22a, 22b need not be limited to personal computers, but may include hand-held devices, multiprocessor systems, microprocessor-based or programmable consumer electronics, minicomputers, mainframe computers, personal digital assistants, cellular telephones or the like depending upon their intended end use within the system. For performing the procedures described hereinafter, the computer executable instructions may be written as routines, programs, objects, components, and/or data structures that perform particular tasks. Within the computer network 20, the computer executable instructions may reside on a single computer 22a, 22b or the tasks performed by the computer executable instructions may be distributed among a plurality of the computers 22a, 22b. Therefore, while described in the context of a computer network, it should also be understood that the present invention may be embodied in a stand-alone, general purpose computing device that need not be connected to a network.

To efficiently provide users with access to the software application 30, the server computers 22b and the underlying framework for the computer network 20 may be provided by an application service provider ("ASP"), such as Verio®. ASP's are companies that provide server computers that store and run a software application, which is accessible to users via the Internet or similar means. Therefore, users are able to access and use software applications without storing the software application on the remote computers. It should be understood, however, that ASP models are well-known in the industry and should not be viewed as a limitation with respect to the type of system architectures that are capable of providing a computer network 20 that can properly operate the software application discussed herein.

To perform the particular tasks in accordance with the computer executable instructions, the computers 22a, 22b may include, as needed, a video adapter, a processing unit, a system memory, and a system bus that couples the system memory to the processing unit. The video adapter allows the computers 22a, 22b to support a display, such as a cathode ray tube ("CRT"), a liquid crystal display ("LCD"), a flat screen monitor, a touch screen monitor or similar means for displaying textual and graphical data to a user. The display allows a user to view information, such as, code, file directories, error logs, execution logs and graphical user interface tools.

The computers 22*a*, 22*b* may further include read only memory (ROM), a hard disk drive for reading from and writing to a hard disk, a magnetic disk drive for reading from and writing to a magnetic disk, and/or an optical disk drive for reading from and writing to a removable optical disk. The hard disk drive, magnetic disk drive, and optical disk drive may be connected to the system bus by a hard disk drive interface, a magnetic disk drive interface, and an optical disk drive interface, respectively. The drives and their associated computer-readable media provide a means of non-volatile storage for the computer executable instructions and any other data structures, program modules, databases, etc. utilized during the operation of the computers 22*a*, 22*b*.

To connect the computers 22*a*, 22*b* within the computer network 20, the computers 22*a*, 22*b* may include a network interface or adapter. When used in a wide area network, such as the Internet, the computers 22*a*, 22*b* typically include a modem or similar device. The modem, which may be internal or external, is connected to the system bus via a serial port interface. It will be appreciated that the described network connections are exemplary and that other means of establishing a communications link between the computers 22*a*, 22*b* may be used. For example, the system may also include a wireless access interface that receives and transmits information via a wireless communications medium, such as a cellular communications network, a satellite communications network, or another similar type of wireless network. It should also be appreciated that the network interface will be capable of employing TCP/IP, FTP, SFTP, Telnet 551-I, HTTP, SHTTP, RSH, REXEC, etc. and other network connectivity protocols.

As mentioned above, it is preferred that the software application 30 and databases 24 reside on the application server computer 22*b*. Therefore, it is likely that the ASP will be responsible for managing and maintaining the software application 30 and databases 24. Those with skill in the art will understand, however, that the software application 30 and databases may also reside on the remote computer 22*a* and be managed and maintained by the user. More specifically, the software application 30 may be stored on a TreeBSD shared host located at www.mpasa.com and the databases 24 may be stored on an MS-SQL server located at sqllSOO.mssqlservers.com. The graphical user interface 50 may load web pages via HTTP or H'TTPS, and reports may be provided to users as ".pdf" files.

For populating the databases 24, the browser may be utilized, but this may also be accomplished via an MS-SQL Server Enterprise Manager. While the software application 30 may be programmed in any software language capable of producing the desired functionality, it is envisioned that the software application 30 will be programmed using HTML, Javascript, PHP3, or MS-SQL Stored Procedures.

For maintaining the security associated with the software application 30 and databases 24, a unique login page may be maintained for each company/user. The login page may also be used to control the access privileges for various levels of users. In addition, each login page may also require a user name and password. For security purposes, the user names and passwords may be kept separately for each company that is accessing the software application 30. To gain access to the software application 30, the user must access the correct login page for that company and/or user and enter the proper user name and password. This login page access is obtained via a unique URL address assigned to the page. It should be appreciated that different login procedures may be employed, which are well known in the industry, on an as-needed basis.

To maintain edit, populate and maintain the databases 24, the graphical user interface 50 allows the user to perform standard text editing functions, including, mouse placement of the cursor, click-and-drag text selection and standard Windows® key combinations for cutting, copying and pasting data. In addition, the graphical user interface 50 allows users to access, copy, save, export or send data or files by using standard Windows® file transfer functions. It should be understood that these editing and file transfer functions may also be accomplished within other operating system environments, such as LINUX®, MAC OS®, Mozilla®, etc.

Manager's View

Figure 2:
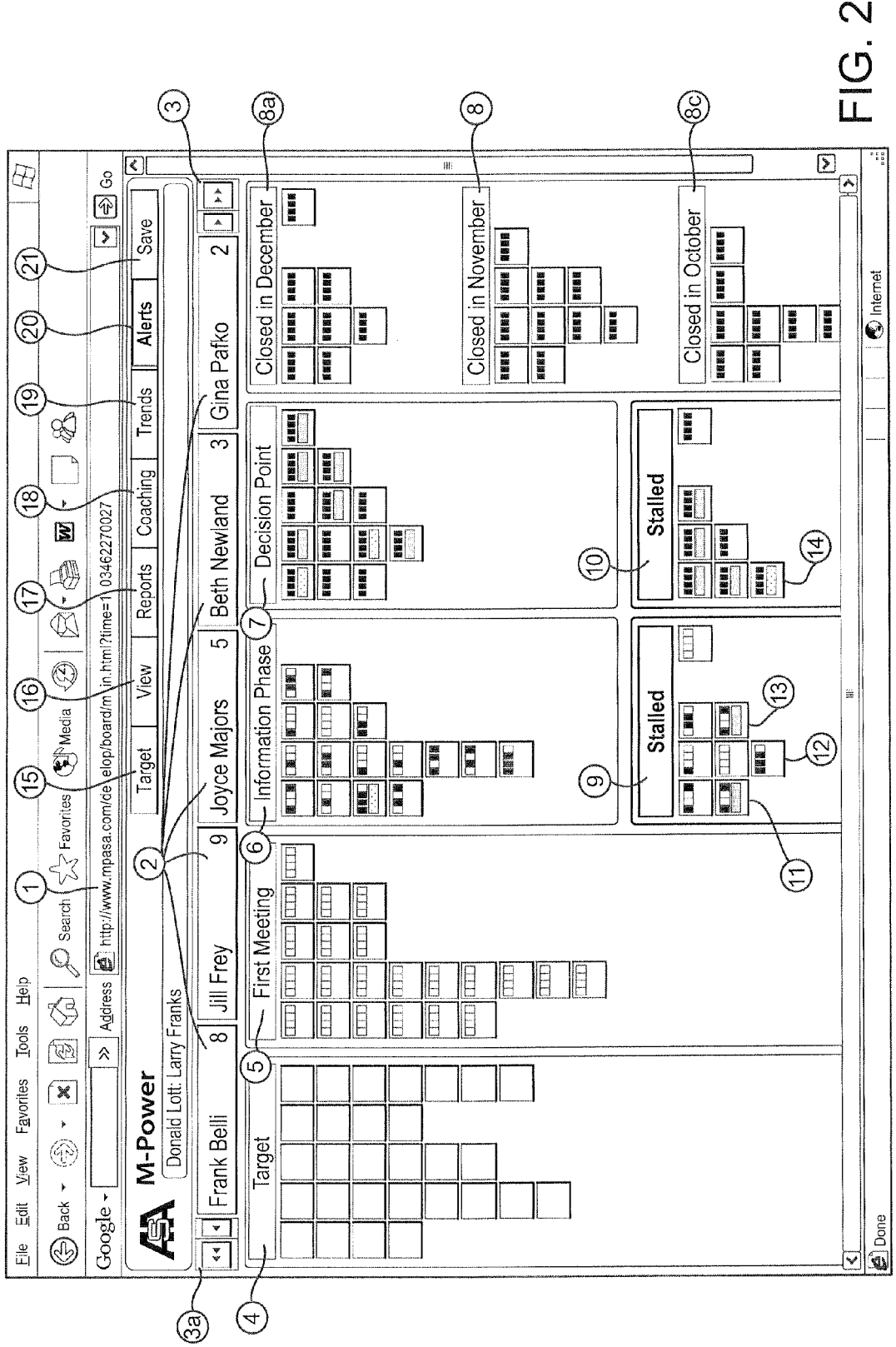
FIG. 2 is an exemplary screen shot of the manager's view.

A sales manager has access to all information input by the sales associates. Additionally, the system provides the manager with a variety of tools to analyze, interpret and act upon the quality and quantity of selling activity for each salesperson. The default Manager's view is shown in FIG. 2.

Manager's View Key

1) Web Address—The unique system web address for your company.

2) Names of Displayed Salespeople—Up to five (5) salespeople can be displayed at a time, and appear in alphabetical order by their last name. Colored boxes containing their name indicate the color of their opportunities on the board. The color order remains consistent throughout the various board areas. A numerical Rating is displayed next to the name. The system rates the salesperson's funnel on a scale of 1-10 (10 being highest), based upon the likelihood of consistent success. This is the same Rating that appears in the Coaching Report.

The default viewing order is alphabetical by last name. Clicking onto one of these boxes takes you directly into that Salesperson's view.

3) Salesperson Navigation Buttons—If you have more than 5 salespeople in your group, the buttons to the left and right of the name boxes allow you to view them.

3*a*) The "single arrow" box to the left of the names will shift all columns one space to the right. The leftmost column of all board areas will display information for the previous salesperson in selected view order. The "double arrow" box to the left of the names will shift all columns five spaces to the right, displaying information for the previous five salespeople in selected view order.

3*b*) The "single arrow" box to the right of the names will shift all columns one space to the left. The rightmost column of all board areas will display information for the next salesperson in selected view order. The "double arrow" box to the right of the names will shift all columns five spaces to the left, displaying information for the next five salespeople in selected view order.

4) "Target" Column—This area is populated with companies or divisions that are not currently doing business with the user and are not actively engaged in a selling process, but that we have made the strategic decision to pursue. Targets can be large potential customers within a territory, leads attained through marketing efforts, new divisions within existing customers or other entities that warrant visibility. Target opportunities may be assigned to specific salespeople by the sales manager, or entered directly by an individual salesperson.

5) "First Meeting" Column—Opportunities reside within the First Meeting column if the salesperson has scheduled an initial substantive discussion at a new prospective client company, but that meeting has not yet taken place. Additionally, this column is used to track new, known opportunities at existing clients for which the first substantive discussion is scheduled to take place. For salespeople who sell face-to-face, these should be scheduled to take place in person. For those salespeople who sell primarily over the telephone, scheduling phone meetings is appropriate as long as substantive discussion will occur. A salesperson must be meeting with an individual who can affect a purchase decision of the product/service at the prospect.

Typically, opportunities are added to the system in the "First Meeting" column, as this represents the beginning of the sales cycle. "First Meeting" opportunities do not contain Opportunity Name, Sale Value or Milestone information, as they would not yet be known or confirmed. This policy helps assure that no assumptions are made regarding these key pieces of information. As they become known through the discovery process, the information is recorded via the Opportunity Edit View.

6) Information Phase Column—Opportunities reside within the Information Phase column only if a substantive initial discussion took place with an individual who can affect a purchase decision of your product/service at the prospect, and an appropriate next step appointment with an agenda to advance a specific sale is scheduled. The number of appointments to date is irrelevant. An opportunity should be placed in the Information Phase if the salesperson is not yet ready to ask for the order. By the system's definition, this is the portion of the sales cycle after the First Meeting and prior to the attainment of all Milestones. (see item 12 below)

7) Decision Point Column—Opportunities reside within the Decision Point column if the salesperson has attained all Milestones (see item 12 below) and either:

7a) Has a scheduled near-term appointment to ask for the order. This scheduled appointment may include delivery/review of a final proposal, contracts or other relevant documents for the purpose of obtaining a final yes/no decision.

7b) Has a scheduled near-term appointment to receive the prospect's decision. This appointment may be in person or via the telephone, but must be in the calendar of the prospect decision-maker.

8) Closed Column—Opportunities won during the current and most recent two management periods reside in this column. The company can select monthly or quarterly definitions for these periods.

8a) Closed (Current Period Name)—Opportunities that closed during the current period reside within the top section of this column.

8b) Closed (Most Recent Previous Period Name)—Opportunities that closed during the most recent previous period reside in the middle section of this column.

8c) Closed (Second Most Recent Previous Period Name)—Opportunities that closed during the second most recent previous period reside in the bottom section of this column.

Note: Closed opportunities for each salesperson move down this column as periods pass. After the second most recent previous period has passed, those opportunities are no longer displayed within the system.

9) Stalled-Information Phase—Opportunities reside within Stalled-Information Phase if the salesperson was unable to schedule a subsequent appointment during a recent First Meeting or Information Phase appointment, or a scheduled Information Phase appointment was cancelled by either the prospect or the salesperson and not rescheduled. In either case, the salesperson must have a near-term desire and strategy to set an appointment for the purpose of advancing a specific sale.

10) Stalled-Decision Point—Opportunities reside within Stalled-Decision Point if the salesperson has attained all Milestones (see item 12 below) and either:

a) The scheduled near-term Decision Point appointment was cancelled by either the prospect or the salesperson and not rescheduled.

b) The original prospect decision date has passed, and no near-term decision date has been scheduled.

In either case, the salesperson must have a near-term desire and strategy to set an appointment for the purpose of advancing a specific sale.

11) Opportunity Box—Every discrete opportunity being worked by the sales team is represented by an Opportunity Box. In the Managers view, no identifiable detail is visible. The milestone (see item 12 below) configuration is evident. To see the detail regarding all of a salesperson's opportunities in any column, position your pointer over the desired column then click. The Spreadsheet View (see below) of that column will display. For example: If a manager using the view in the above illustration wanted to see the Information Phase opportunities of Jill Frey, he/she would position their pointer on any green box within the Information Phase column and click.

12) Milestones—From the initial appointment through submission of a final proposal, a salesperson undertakes a "process of discovery" with the prospect. During this period, which constitutes the longest period of time within the sales cycle, the salesperson must progress the sale from its beginning to that moment when it is appropriate to ask for the business. The system categorizes this time as the "Information Phase."

During the Information Phase, a salesperson must focus on attaining key milestones required to have a reasonable chance for success when asking for the order. The system incorporates four key milestones for tracking sales cycle progress. They are:

a) Person—It is imperative that the salesperson is in regular communication with the prospect contact responsible for making the purchase decision. Generally, this is the individual who signs a purchase order, or authorizes funding for your product/service. If the authorization truly is of the "rubber stamping" variety, this is not the individual being referred to here. The important aspect is that the salesperson is dealing with the person who will make the decision to buy. Additionally, and as importantly, the salesperson must be able to demonstrate that the decision maker has the desire to change from the current method(s) of doing business. This desire can be for a number of reasons, including price, customer service, product dependability, etc. Without any compelling reason to change, it is unlikely that the salesperson can affect a sale. When the salesperson attains the ability to regularly meet with a change-desiring decision maker, the Person milestone is attained.

b) Need—Ultimately, your product/service must fill one or more needs at your prospect. The salesperson must be able to prove to the prospect that their business will be enhanced through the purchase. If the client recognizes this need during the prospecting process, it may be the reason that a salesperson was able to secure a first meeting. Other times, the need is not firmly established prior to the discovery process. In either case, the salesperson must be able to demonstrate the client's belief that the product/service fills an appropriate need. When the sales manager agrees, the Need milestone may be considered fulfilled.

c) Money—For some reason, many salespeople avoid price discussions until very late in the sales cycle. Most can cite specific examples of their prospects' "sticker shock" when the issue was finally raised. The further along in the sales cycle the opportunity is, however, the more difficult it will be to overcome a serious price objection.

The best salespeople approach the funding issue early in the sales cycle. While there is no need to provide an exact price, a framework, or range must be discussed in order to obtain a prospect's reaction to the cost of your product/service. The salesperson may not like the reaction, but nonetheless has to know it. This will help determine if there is a reason to continue the sale, or at least quantify the value proposition that must be ultimately presented. The Money milestone is met when the salesperson demonstrates that the prospect has adequate funding that can be committed to the purchase of your product/service.

d) Time—The adherence of an opportunity to a normal sales cycle is a crucial determinant of success. In general, the longer an opportunity's sales cycle, the less likely it is to close. Certainly, as a particular opportunity extends beyond its normal sales cycle, its chances for success diminish. To meet the "Time" milestone, the salesperson and prospect must agree that a purchase would occur within the timeframe that is considered "normal" for your product/service. Prospect promises to buy beyond this timeframe are often left unfulfilled, and therefore cannot be deemed to meet the threshold demanded by this milestone. The Time milestone can be considered met when the prospect has committed to the salesperson that a purchase decision will be made in a timeframe that is commensurate with the product's normal sales cycle.

While the four milestones described above apply to all business-to-business sales that have a definable sales cycle, many companies have additional ones that they require the salesperson to facilitate. These milestones can be varied, and may include such things as:

Sample testing
Credit checking
Production scheduling
Contract negotiation

The system permits a client to establish up to two additional milestones. When utilized, they appear in this view as boxes at either end of the standard milestones and are given client-determined names, which display in the Spreadsheet and Edit views.

Opportunities within the First Meeting column have no milestones attributed to them, as none of this information would be confirmed prior to an initial substantive appointment. Opportunities within the Information Phase column have 0-3 milestones (if only the standard ones are utilized). The opportunity cannot move to Decision Point or Closed unless all milestones are fulfilled and marked as such on the box (via the Edit view as described below).

Milestones may be achieved during the first meeting regarding an opportunity, or any subsequent meeting during the Information Phase. Meeting the milestones requires a salesperson to ask questions of the prospect in the key areas necessary to move the sale forward. Focusing on these areas helps the salesperson facilitate appropriate conversations, and get to levels of the prospect organization necessary to make a sale happen.

13) Red-Alert Box—This red box indicates that an opportunity is extending well past its normal sales cycle. The system records the actual sales cycle lengths (First Meeting date to Closed date) for all closed opportunities of each product type. If this opportunity's sales cycle length is currently longer than a company-selected percentage of all opportunities of this product type that have closed, (generally 80%) the Red-Alert box will appear. For the manager, this example indicates that 80% of all opportunities for this product closed in a period of time that was shorter than this opportunity has been open.

14) Yellow-Alert Box—Similar in purpose to the Red-Alert Box described above, the Yellow-Alert has a lower threshold for percentage of closed opportunities for the product type (generally 60%). This example indicates that 60% of all opportunities for this product closed in a period of time that was shorter than this opportunity has been open. While not as serious as the Red-Alert, it does tell a manager that the opportunity is older than most of its type that have Closed, and should be watched.

Figure 3:
FIG. 3 illustrates an exemplary new target window.

15) Target Button—The Target button allows you to create new target opportunities. Clicking on it brings up the window illustrated in FIG. 3.

Figure 4:
FIG. 4 illustrates an exemplary view options window.

16) View Button—The View button allows you to select the manner and the order in which you would like the salesperson's information displayed. Clicking on it brings up the "View Options" window shown in FIG. 4.

The system's default view is one in which opportunities are grouped by sales cycle category. In this configuration, the manager can sort the salespeople Last Name, (default) First Name, System Rating (see Analysis section below) or Start Date. Selections can specify ascending or descending order.

Additionally, the manager can uncheck the "Show Ratings" box, which suppresses viewing of each salesperson's numerical rating. This is useful when using the board in a sales meeting setting where the manager may not want to share this information with others. At any time, the manager may recheck this box to display the ratings of the individual salespeople.

Figure 5:
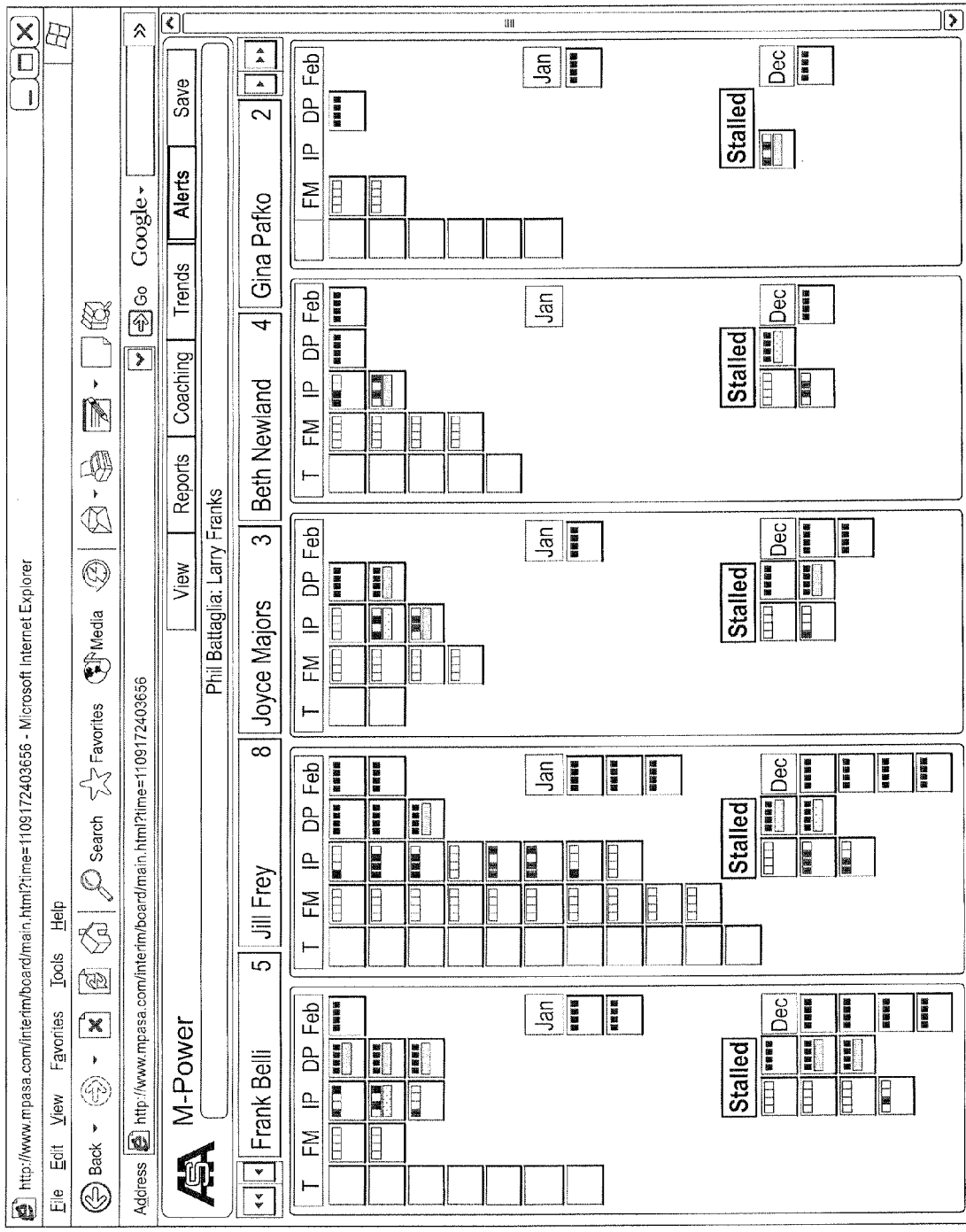
FIG. 5 illustrates an exemplary side-by-side view.
Figure 10:
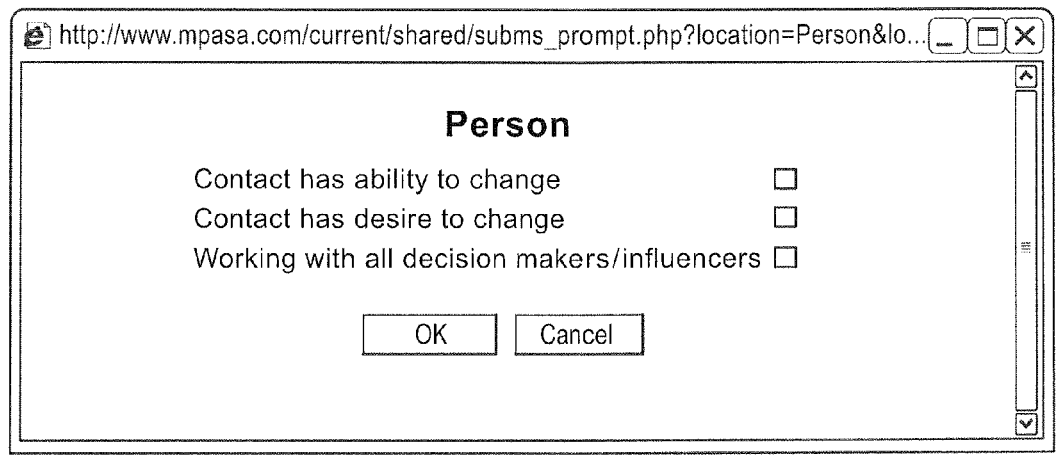
FIGS. 10-13 illustrate exemplary checklist boxes.
Figure 11:
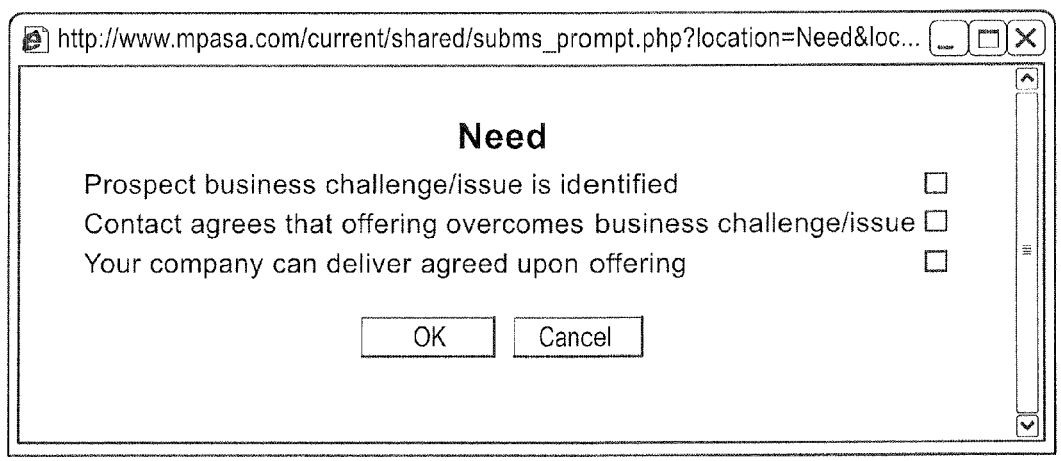
Figure 12:
Figure 13:
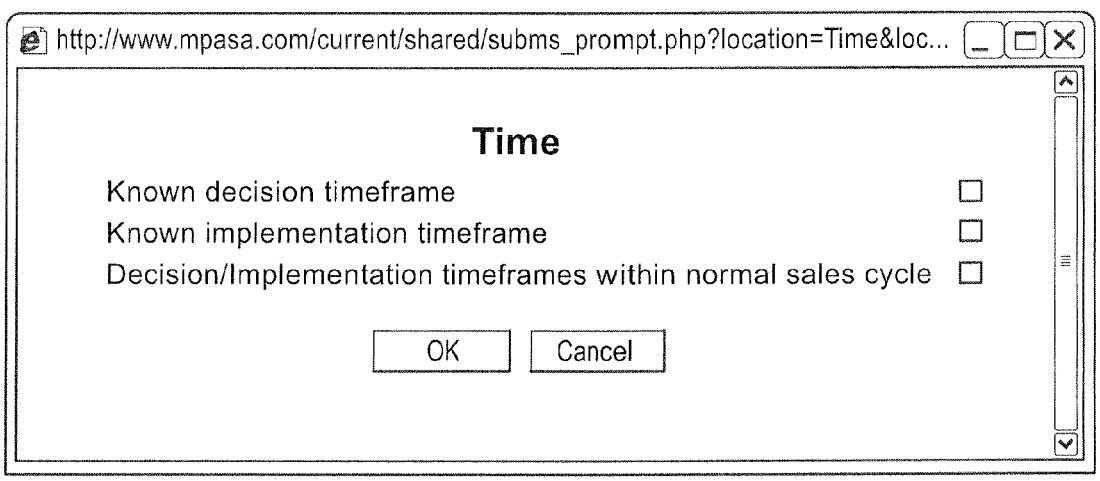

You can also view the board in a "side-by-side" view, which groups opportunities by salesperson instead of cycle category. This easily allows you to discern differences in the sales funnels of your team. When selected from the "view" window, the side-by-side display is as shown in FIG. 5.

17) Reports Button—The Reports button provides access to the system reporting system. When clicked, any available report can be selected from a simple drop-down menu. All reports are displayed on the computer, with additional print capability.

18) Coaching Button—This button provides access to the system coaching report. See the "Utilizing the system Coaching and Trends Sections" section of this specification below.

19) Trends Button—This button provides access to the system trends system. See the "Utilizing the system Analysis and Trends Sections" section of this specification below.

20) Alerts Button—This button provides access to the system alerts system. When this button is illuminated in red, it indicates that active alerts exist for one or more salespeople. See the "Alerts" section of this specification below.

21) Save Button—This button allows the user to save all entered information. It illuminates in red whenever new data exists. The user must click on this button prior to exiting the system, or any entries since the last "Save" will be lost.

Salesperson's View

Figure 6:
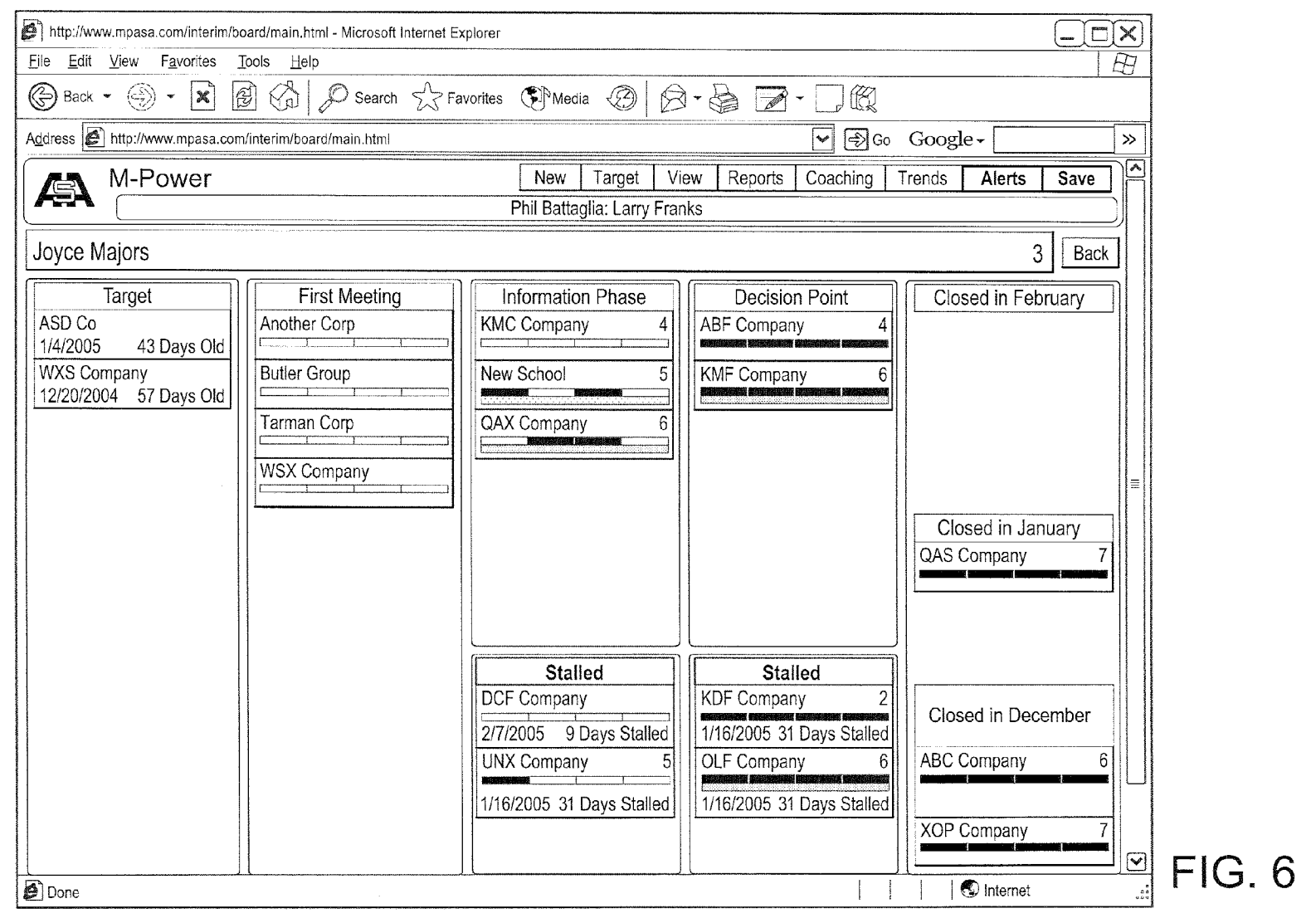

Clicking on the name of any salesperson in the Manager's View brings up the "Salesperson's View" for that individual, shown in FIG. 6. This view is identical to that seen by the salesperson, except for the inclusion of the managerial functions "Reports", "Analysis", "Trends" and "Alerts".

The Salesperson's view has room to display the Company Name field for every opportunity, and aids in the facilitation of activity analysis and discussion between manager and salesperson.

To better understand the salesperson's effectiveness of advancing opportunities through the sales cycle, the system measures and displays on the Salesperson's View two key periods of time:

1) Days in Target—When a company is entered into the "Target" column, a "Date Assigned" field is completed (see "Target Button" descriptor above). The assigned date appears in the lower left corner of each Target box for the salesperson. The number of days between the assigned date and the current date appears in the lower right corner of each Target box.

2) Days Stalled—An opportunity moves to a "Stalled" category when it has no scheduled next step. Each opportunity within either "Stalled" column will display the date the opportunity most recently entered the "Stalled" column (lower left corner) and the number of days between that date and the current date (lower right corner).

Spreadsheet View

The Manager's and Salesperson's views provides broad visualizations of each salesperson's activity. Clicking the mouse on any column in either view will provide that column's detailed opportunity information. For example, clicking on Bob Adamson's Information Phase column on the Manager's board illustrated above will generate the view shown in FIG. 7.

Spreadsheet View Key

101) Column Headers—Opportunities can be sorted by the values in any field. Clicking once on the column header sorts opportunities in ascending order of that column. Clicking twice on the column header sorts opportunities in descending order of that column.

102) Edit Arrow—Clicking on this arrow brings up the "Edit" view for the opportunity. All opportunity changes are made from the Edit view. See the "Editing Individual Opportunities" section for details.

103) "!"—This column will be blank unless the opportunity has one of the following attributes:

If the opportunity resides in the First Meeting column, a "!" in this box indicates that the scheduled First Meeting date has passed. This helps determine the validity of First Meeting appointments as well as system usage.

If the opportunity resides in any other area of the board, a "Y" in this field indicates that the "Yellow Alert" applies. An "R" in this field indicated that the "Red Alert" applies.

104) Company—The name of the prospect company as entered in the "Edit" view.

105) Val. Level—The estimation of a potential account's total value as entered through the Valuation field of the Opportunity Edit screen. The number, if entered, represents one of up to twenty valuation ranges.

106) First Mtg.—The date of the first substantive appointment regarding this opportunity as entered in the "Edit" view.

107) Opportunity—The product or service that applies to this opportunity, as entered in the "Edit" view. Available products are selected in the "Edit" view via a drop-down box.

108) Unit Value—The value of the opportunity as entered in the "Edit" view. Units are defined by company (Dollars, Pounds, etc.). Once this value is entered in that view, the salesperson or manager cannot change it. Opportunities that close will require the entry of a "Closed Value," which allows the manager to compare the salesperson's anticipated opportunity value to actual. Changes to "Unit Value" fields can be performed by a system administrator.

109) Milestones—All company-utilized milestones are displayed here. Those that have been "checked off" in the "Edit" view will appear in black.

110) Next Mtg.—The date of the next substantive meeting with the prospect as entered in the "Edit" view.

111) Print—Clicking this button will generate a printed version of this view.

Milestone criteria can be easily displayed while the user is in the Spreadsheet view. Simply position the cursor over an uncompleted milestone for an opportunity. A box will appear listing the milestone criteria. All attained milestones will be "checked" within their associated box. (Completed milestones, appearing in black on the Spreadsheet view, will not display their individual criteria list when the cursor is positioned over them.)

Edit View

Figure 9:
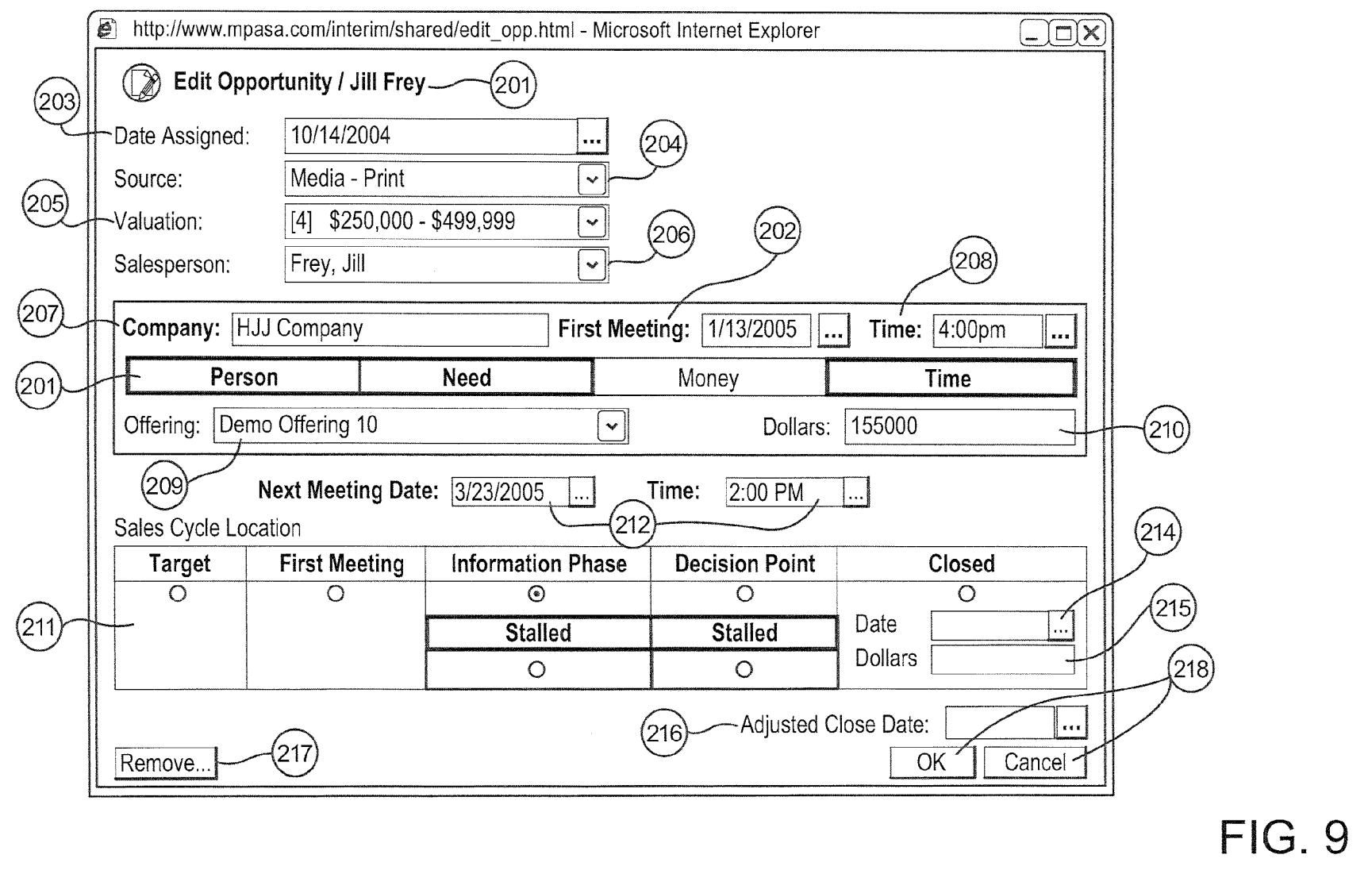

The system Manager's View is populated with information relating to specific opportunities meeting column criteria (FIG. 8). Each opportunity can be displayed on an individual window, which is visualized in the Edit View as shown in FIG. 9. It is accessed from the "Spreadsheet" as shown above. All editing of individual opportunities takes place within this view. Clicking on the white areas of the boxes accesses fields.

Edit View Key

201) Salesperson Name—The name of the salesperson for whom this opportunity applies.

202) Opportunity Box Color—The opportunity box will be displayed using in the salesperson's unique color as found in the "Manager's View."

203) Date Assigned (Displays only if "Target" option is enabled)—The date that the opportunity was designated as a Target. The system will use this date to measure the number of days an opportunity has been in the Target column. If a Target opportunity is reassigned to another salesperson, this field should be updated to reflect the date of that change. Not all opportunities will contain a value in the Date Assigned field. Opportunities that arise from companies other than those specifically targeted for a sales effort should have this field blank.

204) Source (Displays only if "Source" option is enabled)—The lead source that generated this opportunity. A drop-down listing displays the available selections. If the Source option is enabled, this field must be completed to move the opportunity into the Decision Point or Decision Point Stalled categories.

205) Valuation (Displays only if "Valuation" option is enabled)—The overall account potential for the company to which this opportunity applies. A drop-down listing displays the available valuation ranges. Valuation may be categorized according to the user company's specific measurement criteria (Dollars, Units, Employees, Barrels, etc.). If the Valuation option is enabled, this field must be completed to move the opportunity into the Decision Point or Decision Point Stalled categories.

206) Salesperson—The salesperson to whom this opportunity is assigned. The manager has the ability to transfer any opportunity from one salesperson to another member of your team. A drop-down listing of available salespeople permits you to make this selection. If the opportunity is reassigned, the Opportunity Box Color (see above) will automatically change to that of the new salesperson. When the opportunity is Saved, it will immediately appear on the new salesperson's board.

207) Company—The name of the prospect company for which this opportunity applies. If helpful to differentiate opportunities, additional information may be included, such as Division, Location, etc.

208) First Meeting Date and Time—The scheduled date and time of the First Meeting with the company regarding this opportunity. For an existing client, this represents the date that this opportunity was originally discussed. For an existing, yet unsold prospect currently in discussions, this represents the date and time of the First Meeting. For a company that the salesperson has not yet met, but has a scheduled First Meetings with, this represents the date and time that the First Meeting is scheduled to occur.

209) Opportunity (if known)—The product or service that applies to this opportunity. If this opportunity box represents a First Meeting at a new prospect, this space must be left blank. The salesperson cannot assume the scope of the opportunity before the First Meeting. If this card represents an opportunity further along in the sales cycle, the product or service for which it applies is accessed via a drop-down box, and selected when known.

210) Unit Value (if known)—The anticipated value of this opportunity. Units are defined by company (Dollars, Pounds, etc.). If this opportunity box represents a First Meeting at a new prospect, this space must be left blank. The salesperson cannot assume the value of the opportunity before the First Meeting. If this card represents an opportunity further along in the sales cycle, write the unit value for which it applies, if known. Unit values for opportunities that represent recurring revenue should remain consistent; with the manager choosing which period length (daily, weekly, monthly or annually) should be used in recording the value. Note: Once this value is entered in that view, the salesperson or manager cannot change it. Opportunities that close will require the entry of a "Closed Value", which allows the manager to compare the salesperson's anticipated opportunity value to actual. A system administrator can perform changes to "Unit Value" fields.

211) Milestones—Milestones (as defined in the "Manager's View" section above) are accessed here. The above example shows the system's standard milestones. Any company-defined milestones would appear to the left and/or right of the standard ones. Clicking in one of the milestone boxes brings up a pop-up window in which users can record that milestone's progress. Progress is measured by checking off specific questions regarding a milestone. (See Completing Milestones Section Below).

212) Next Meeting Date and Next Meeting Time—If the opportunity is in Information Phase or Decision Point columns, the Next Meeting Date field cannot contain a past date, and the Next Meeting Time field must be completed.

A representation of the board indicates, via a blackened "button", the board area in which the opportunity resides. The system forces adherence to placement rules upon exiting the view. (See "RULES FOR MOVING OPPORTUNITIES" below.)

214) Closed Date—When an opportunity is designated as "Closed" this field must be completed. A calendar pop-up box is accessed next to the box, and the selection is made from there. The value entered here will cause the opportunity to populate the appropriate Closed area on the Manager's view.

215) Closed Value—When an opportunity is designated as "Closed" this field must be completed with the actual value of the sale.

216) Adjusted Close Date—Used to adjust the system-generated Close Date utilized for forecasting purposes. The system calculates an anticipated close date by adding the length of the salesperson's average sales cycle for the offering to the First Meeting date. The resulting date is placed in the appropriate forecasting report period. Extenuating circumstances, however, may lead you to move this date forward or back. This field allows you to record the date you think the opportunity will close. The forecasting report will override its system-generated date with this one. If you remove the Adjusted Close Date, the system will revert to the system-generated date for reporting purposes.

217) Remove—Opportunities that are no longer valid are removed from the system via this button. Clicking it will produce a "Removal Reason" window that requires the user to select from a list of company-specific reasons. Previously removed opportunities can be brought back into the system through the "Revive" function, available when creating new opportunities. (See "Adding New Opportunities" section below).

218) "OK" and "Cancel" Buttons—Click the "OK" button to accept all edits (validation of all entries happens at this time). Click the "Cancel" button to negate all edits.

Completing Milestones

Clicking a Milestone box brings up its associated checklist box. Each checklist consists of points relevant to the milestone. Clicking within the white box next to each point allows the user to indicate to the system that a portion of the milestone has been attained. For the standard system milestones, the checklist boxes are shown in FIGS. 10-13.

To these standard system points, company specific points can be added through an administrative function. Additionally, any company-specific milestones have their own points for review. When the Milestone box is accessed, any previously checked point is indicated. A milestone is not deemed to be complete until all points are checked off, at which time the milestone box in the "Edit Opportunity" view turns black.

Adding New Opportunities

Figure 14:
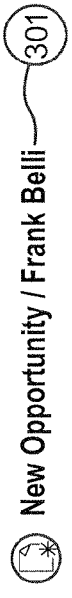
FIG. 14 illustrates an exemplary New Opportunity screen.

Clicking the "New" button in either the Manager's or the Salesperson's view brings up the "New Opportunity" view. It is identical in nature to the "Edit" view described above, with additional features as described with reference to FIG. 14.

New Opportunity View Key

301) New Opportunity Title—This descriptor identifies the view and the salesperson.

302) Revive—Opportunities previously taken off of the Salesperson's View via the "Remove" function can be brought back into the system through this function. Clicking this key will display a drop-down listing of all removed opportunities for the salesperson. The user can select the appropriate opportunity to revive, and locate it within the view accordingly. When used, the Revive function will utilize the original "First Meeting" date in determining sales cycle length. Note: Opportunities that have been "Deleted" by a system administrator cannot be revived.

303) "OK" Button Options—The standard "OK" button has been separated into two functions:

OK Close—Click this button to accept the new or revived opportunity, and return to the "Salesperson's" view.

OK New—Click this button to accept the new or revived opportunity, and stay in the "New Opportunity" view for the entry of additional opportunities into the system.

Rules for Moving Opportunities

Into First Meeting—

Initial Placement Onto Board—An opportunity is placed into the First Meeting column when the salesperson has scheduled an initial substantive discussion at a prospective client company. For salespeople who sell face-to-face, these should be scheduled to take place in person. For those salespeople who sell primarily over the telephone, scheduling phone meetings is appropriate as long as substantive discussion will occur. A salesperson must be meeting with an individual who can affect a purchase decision of your product/service at the prospect.

It is important to note that First Meetings for board prospects can occur only once. Opportunities are not moved from other columns back to the First Meeting column. During the sales cycle, any new potential sales with separate prospect decision processes are tracked separately. These are placed into appropriate system columns according to the system rules. Resurrected opportunities previously removed from the board can be placed into the First Meeting column only if sufficient change at the prospect company requires the salesperson to "start over."

Into Information Phase—

From First Meeting—After the initial meeting with the prospect, an opportunity is moved to the Information Phase column when the salesperson schedules an appointment to meet the prospect again with an agenda to advance a specific sale.

From Stalled (Information Phase)—Stalled Information Phase opportunities with are moved into the Information Phase column when the salesperson schedules an appointment to meet the prospect again with an agenda to advance a specific sale.

From Decision Point—Decision Point opportunities are moved back to Information Phase when one or more system milestones can no longer be considered attained, (i.e., change in Decision Maker) and the salesperson schedules an appointment to meet the prospect again with an agenda to advance a specific sale.

From Stalled (Decision Point)—Stalled Decision Point opportunities are moved to Information Phase when one or more system milestones can no longer be considered attained, (i.e., change in Decision Maker) and the salesperson schedules an appointment to meet the prospect again with an agenda to advance a specific sale.

Initial Placement Onto Board—Opportunities can be initially placed on the board within the Information Phase column only if a substantive initial discussion took place with an individual who can affect a purchase decision of the user company's product/service at the prospect, and that individual has scheduled an appropriate next step appointment with an agenda to advance a specific sale.

Into Information Phase (Stalled)

From Information Phase—An opportunity is moved from Information Phase to Information Phase (Stalled) if the salesperson was unable to schedule a subsequent appointment during an Information Phase appointment, or a scheduled Information Phase appointment was cancelled by either the prospect or the salesperson and not rescheduled. In either case, the salesperson must have a near-term desire and strategy to set an appointment for the purpose of advancing a specific sale. It can remain in Information Phase (Stalled) only until the near-term strategy has been executed, after which it can move to its appropriate column based upon meeting that criteria, or off the board if the strategy did not succeed.

From First Meeting—An opportunity is moved from First Meeting to Information Phase (Stalled) if the salesperson was unable to schedule a subsequent appointment during the First Meeting, but has a near-term desire and strategy to set an appointment for the purpose of advancing a specific sale. It can remain in stalled only until the near-term strategy has been executed, after which it can move to its appropriate column based upon meeting that criteria, or off the board if the strategy did not succeed.

From Decision Point—A Decision Point opportunity moves back to Information Phase (Stalled) when something happens to invalidate one or more of the Decision Point Milestones, and a meeting to obtain the required Milestone information cannot be scheduled. The salesperson must have a near-term desire and strategy to set an appointment for the purpose of advancing the specific opportunity identified on the card. It can remain in Information Phase (Stalled) only until the near-term strategy has been executed, after which it can move to its appropriate column based upon meeting that criteria, or off the board if the strategy did not succeed.

From Decision Point (Stalled)—Stalled Decision Point opportunities are moved to Information Phase (Stalled) when one or more system milestones can no longer be considered attained, (i.e., change in Decision Maker) and the salesperson is unable to schedule an appointment to meet the prospect again with an agenda to advance a specific sale. The salesperson must have a near-term desire and strategy to set an appointment for the purpose of advancing the specific opportunity identified on the card. It can remain in Information Phase (Stalled) only until the near-term strategy has been executed, after which it can move to its appropriate column based upon meeting that criteria, or off the board if the strategy did not succeed.

Initial Placement Onto Board—An opportunity is initially placed into this column if no next step is scheduled, but a near-term strategy exists to get one.

Into Decision Point—

From Information Phase—Opportunities are moved from the Information Phase column to the Decision Point column when all Decision Point Milestones are fulfilled, and the salesperson has scheduled an appointment for the purpose of obtaining a final yes/no decision. This scheduled appointment may include delivery/review of a final proposal, contracts or other relevant documents. If already presented, the meeting represents a mutually agreed upon deadline to make the purchase decision. At that date/time, the final decision will be personally communicated to the salesperson.

From Information Phase (Stalled)—Moving from Information Phase (Stalled) to Decision Point is rare. It occurs only if the salesperson conducts an unscheduled, substantive discussion with the prospect, is able through that discussion to fulfill all remaining Decision Point milestones, and schedules an appointment for the purpose of obtaining a final yes/no decision. This scheduled appointment may include (if not already presented) delivery/review of a final proposal, contracts or other relevant documents.

From Decision Point (Stalled)—Generally, opportunities are moved into the Decision Point (Stalled) column from the Decision Point column because a meeting could not be scheduled to present a final proposal, or because the originally scheduled appointment to obtain a decision lapsed. Opportunities move from Decision Point (Stalled) back to Decision Point when the salesperson schedules a near-term appointment for the purpose of obtaining a final yes/no decision. This scheduled meeting may include (if not already presented) delivery of a final proposal, contracts or other relevant documents.

From First Meeting—Opportunities are moved from the First Meeting column to the Decision Point column only if all Decision Point Milestones are fulfilled during the initial appointment, and the salesperson has scheduled an appointment for the purpose of obtaining a final yes/no decision. This scheduled appointment may include delivery/review of a final proposal, contracts or other relevant documents. If already presented, the meeting represents a mutually agreed upon deadline to make the purchase decision. At that date/time, the final decision will be personally communicated to the salesperson.

Initial Placement Onto Board—This is a rare occurrence, and generally only happens when an opportunity is identified at an existing customer in a client management setting, the salesperson is immediately able to fulfill all milestones and schedule an appointment for the purpose of obtaining a final yes/no decision. This scheduled appointment may include delivery/review of a final proposal, contracts or other relevant documents. A manager should always be suspect of opportunities entering the board at Decision Point, and must take care to validate the facts presented by the salesperson.

Into Decision Point (Stalled)

From Decision Point—An opportunity is moved from Decision Point to Decision Point (Stalled) if the scheduled Decision Point appointment was cancelled by either the prospect or the salesperson and not rescheduled. It also is moved into this category if the original prospect decision date has passed, and no near-term decision date has been scheduled. In either case, the salesperson must have a near-term desire and strategy to set an appointment for the purpose of advancing a specific sale. It can remain in Decision Point (Stalled) only until the near-term strategy has been executed, after which it can move to its appropriate column based upon meeting that criteria, or off the board if the strategy did not succeed.

From First Meeting—This is a rare occurrence, at best. Opportunities are moved from the First Meeting column to the Decision Point (Stalled) column only if all Decision Point Milestones are fulfilled during the initial appointment, and the salesperson is unable to schedule an appointment for the purpose of obtaining a final yes/no decision. It is highly unlikely that a salesperson who attains all Decision Point milestones during the initial appointment would be unable to schedule a Decision Point Meeting. The manager must always be suspect of opportunities moving in this manner, and must take care to validate the facts presented by the salesperson.

Initial Placement Onto Board—An opportunity is never initially placed onto the system Board in the Decision Point (Stalled) column.

Into Closed—

From Any Other Column—An opportunity is moved into Closed from Decision Point when the salesperson and prospect complete all necessary formal agreements required to consummate the sale.

Initial Placement Onto Board—An opportunity is initially placed onto the system Board in this column if the sale was unexpected. This is most likely to occur if a new prospect contacts the salesperson to place an order, or if a prospect for previously removed opportunity suddenly elects to buy.

Input Rules

The following input rules are in place when attempting to put opportunities into categories:

First Meeting:
Company Name
Valid First Meeting Date
Information Phase:
First Meeting Fields plus
Valid Next Meeting Date
Valid Next Meeting Time
Decision Point:
Information Phase Fields plus
Valid Next Meeting Date
Valid Next Meeting Time
Opportunity Descriptor
Unit Value Amount
All Milestones Checked
Source (if utilized)
Valuation (if utilized)
Closed:
Decision Point Fields plus
Closed Date
Closed Value
Stalled-Information Phase
First Meeting Fields
Stalled-Decision Point:
Decision Point Fields less
Next Meeting Date and Time
Target:
Company Name
Target Date Assigned Managing with the System The system is much more than the electronic system explained in this document. It challenges salespeople and managers to look at opportunities and activities differently. Very importantly, the system can enhance the tactical and strategic effectiveness of your sales meetings, either one-on-one or with the selling team. This section will provide some guidelines on the key areas of those conversations.

Validate Next Steps

The rules for placing opportunities in the First Meeting, Information Phase and Decision Point columns very clearly state that the salesperson must have a scheduled appointment with the prospect. This point warrants specific validation on the part of the sales manager. The sales manager must ensure that the salesperson has real next steps for all of the opportunities placed into these columns.

At any given time, a salesperson may have plans to reach out to a number of individuals. If an electronic contact management system is utilized, a number of actions, or alarms, may be scheduled for salesperson follow-up with individuals at various companies within their territory. While it is important to schedule and execute calls of this type, they do not by themselves represent specific next steps with prospects. To qualify as such, a prospect has to have the date and time in their appointment book. As importantly, the prospect must have a specific agenda for the appointment that is designed to advance a potential purchase.

Many salespeople will plan to "drop by" an existing prospect, and call that action a next step. It is not. The most important determinant of a real next step is, once again, the prospect's agenda for the meeting. If the salesperson is calling upon the contact to "see if anything has progressed", "check on the status of things", "get an update", etc. the opportunity cannot appear in the upper area of the board.

First Meeting opportunities must be limited to meetings with individuals who can affect specific purchase decisions regarding the salesperson's product or service. Often, these are acquired through "cold calls" to potential buyers. Many times, salespeople schedule meetings with other individuals within target prospects for the purpose of networking, or helping to open appropriate doors. While these are important, they cannot be counted as First Meetings. Hopefully, the results of these encounters are commitments to facilitate introductions to buyers. If an introduction is made, and the salesperson schedules an initial meeting with an individual who can affect a purchase decision, the criteria for placement in the First Meeting column is met.

Information Phase opportunities must have scheduled meetings designed to share information between the salesperson's company and the prospect. While this may be between the salesperson and the primary contact, it may also be between other individuals to share technical information, conduct site or user visits, review product trials or perform similar activities designed to further the selling process.

Decision Point meetings must allow the salesperson to either present and review the final proposal to the decision maker, or obtain the final decision from the prospect. A date and time to simply "drop off" a proposal does not constitute a Decision Point meeting. The manager should be particularly wary of this tactic, as it demonstrates that the salesperson is not in control of the sales process. The date and time to obtain a decision must also be scheduled with the prospect. If this cannot be done, the prospect most likely does not have a sense of urgency regarding the purchase. In this case, the salesperson and manager must be suspicious of the prospect's intent to buy.

If the manager cannot validate an opportunity per the above requirements, it cannot be placed in the upper areas of the system board. A First Meeting opportunity that fails to meet the above criteria should be removed entirely. For those within the Information Phase column, if a near-term strategy can be developed to secure a scheduled next step with the prospect, the opportunity should be moved into Stalled-Information Phase until the strategy is executed. If an appointment can be secured, it can, at that point, move back into the Information Phase column. If the strategy fails, however, the opportunity should be removed from the board entirely. At that point, the salesperson can schedule, within their contact management system, an appropriate follow-up call at a future date. Decision Point opportunities that do not meet the manager's test must be placed in the Stalled-Decision Point column. They should remain there for only as long as it should reasonably take a prospect to make a decision, given a normal sales cycle. If a decision cannot be obtained within that timeframe, and the salesperson and manager have exhausted all attempts to obtain a decision, the opportunity should be removed from the board. Additionally, if the prospect elects to purchase from a competitor, or make no purchase at all, the opportunity should be removed.

For the system board to correctly represent a salesperson's level of activity, the "Next Step" rules must be followed exactly. Most managers will find that only a small percentage of opportunities being worked by their sales teams meet the criteria. This is entirely intentional. The simple truth is that prospects for which next steps are scheduled have a much greater likelihood of purchasing than those that do not, and it is these that the system considers "real." Tracking the number of "real" opportunities in each phase of the sales cycle will tell the manager if the salesperson has enough potential business in their "funnel" now to ensure future success. Validating next steps involves simply asking the salesperson questions such as "When are you going back?" and "What is the prospect looking to accomplish in this meeting?"

Verify Milestones

From the initial appointment through submission of a final proposal, a salesperson undertakes a "process of discovery" with the prospect. During this period, which constitutes the longest period of time within the sales cycle, the salesperson must progress the sale from its beginning to that moment when it is appropriate to ask for the business. The system categorizes this time as the "Information Phase."

During the Information Phase, a salesperson must focus on attaining key milestones required to have a reasonable chance for success when asking for the order. The system incorporates four key milestones for tracking sales cycle progress. They are:

Person—

It is imperative that the salesperson is in regular communication with the prospect contact responsible for making the purchase decision. Generally, this is the individual who signs a purchase order, or authorizes funding for your product/service. If the authorization truly is of the "rubber stamping" variety, this is not the individual being referred to here. The important aspect is that the salesperson is dealing with the person who will make the decision to buy. Additionally, and as importantly, the salesperson must be able to demonstrate that the decision maker has the desire to change from the current method(s) of doing business. This desire can be for a number of reasons, including price, customer service, product dependability, etc. Without any compelling reason to change, it is unlikely that the salesperson can affect a sale. When the salesperson attains the ability to regularly meet with a change-desiring decision maker, the Person milestone is attained.

Need—

Ultimately, your product/service must fill one or more needs at your prospect. The salesperson must be able to prove to the prospect that their business will be enhanced through the purchase. If the client recognizes this need during the prospecting process, it may be the reason that a salesperson was able to secure a first meeting. Other times, the need is not firmly established prior to the discovery process. In either case, the salesperson must be able to demonstrate the client's belief that the product/service fills an appropriate need. When the sales manager agrees, the Need milestone may be considered fulfilled.

Money—

For some reason, many salespeople avoid price discussions until very late in the sales cycle. Most can cite specific examples of their prospects' "sticker shock" when the issue was finally raised. The further along in the sales cycle the opportunity is, however, the more difficult it will be to overcome a serious price objection.

The best salespeople approach the funding issue early in the sales cycle. While there is no need to provide an exact price, a framework, or range must be discussed in order to obtain a prospect's reaction to the cost of your product/service. The salesperson may not like the reaction, but nonetheless has to know it. This will help determine if there is a reason to continue the sale, or at least quantify the value proposition that must be ultimately presented. The Money milestone is met when the salesperson demonstrates that the prospect has adequate funding that can be committed to the purchase of your product/service.

Time—

The adherence of an opportunity to a normal sales cycle is a crucial determinant of success. In general, the longer an opportunity's sales cycle, the less likely it is to close. Certainly, as a particular opportunity extends beyond its normal sales cycle, its chances for success diminish. To meet the "Time" milestone, the salesperson and prospect must agree that a purchase would occur within the timeframe that is considered "normal" for your product/service. Prospect promises to buy beyond this timeframe are often left unfulfilled, and therefore cannot be deemed to meet the threshold demanded by this milestone.

The Time milestone can be considered met when the prospect has committed to the salesperson that a purchase decision will be made in a timeframe that is commensurate with the product's normal sales cycle.

User-Defined Milestones—

While the four milestones described above apply to all business-to-business sales that have a definable sales cycle, many companies have additional ones that they require the salesperson to facilitate. These milestones can be varied, and may include such things as:

Sample testing
Credit checking
Production scheduling
Contract negotiation

The system permits a client to establish up to two additional milestones. When utilized, they appear as boxes at either end of the standard milestones and are given client-determined names. The system will determine if trends exist for these milestones as well, and permit a client to develop and display specific verbiage for use in working through them.

Milestones may be achieved during the first meeting regarding an opportunity, or any subsequent meeting during the Information Phase. Meeting the milestones requires a salesperson to ask questions of the prospect in the key areas necessary to move the sale forward. Focusing on these areas helps the salesperson facilitate appropriate conversations, and get to levels of the prospect organization necessary to make a sale happen.

As the salesperson attains each milestone, its area on the opportunity display is checked with a mouse click. By definition, an opportunity cannot move past the Information Phase until all milestones have been met. At that time, which is easily seen when all opportunity milestones are darkened, the salesperson has those things in place to provide the best chance for getting the sale, and at that time should ask for the order!! The opportunity is then moved from Information Phase to Decision Point. (The "Moving Opportunities" section below provides complete rules regarding the board placement of opportunities.)

When initially implementing the system, the trainer, sales manager and salesperson should review all opportunities placed on the board. Using questions from the Analysis screen for that salesperson, the trainer and manager should attempt to determine which milestones have been attained. (see "Utilizing the system Analysis and Trends Tools" section below) Based upon this information and the status of a scheduled next step, the manager must verify proper placement on the board. Based upon what is known about the opportunity, the manager should not hesitate to move opportunities to more appropriate columns, or off the board entirely.

It is not in the best interests of the salesperson to leave opportunities on the board that do not really belong. The visualization element of the system can lead individuals to think that they are working on an appropriate number of valid opportunities, when in fact this is not the case. Leaving them in a "Stalled" column has the same affect. Stalled opportunities should be removed from the board entirely if no near-term strategy to meet with the prospect can be executed.

Utilizing the Coaching and Trends Sections

Figure 15:
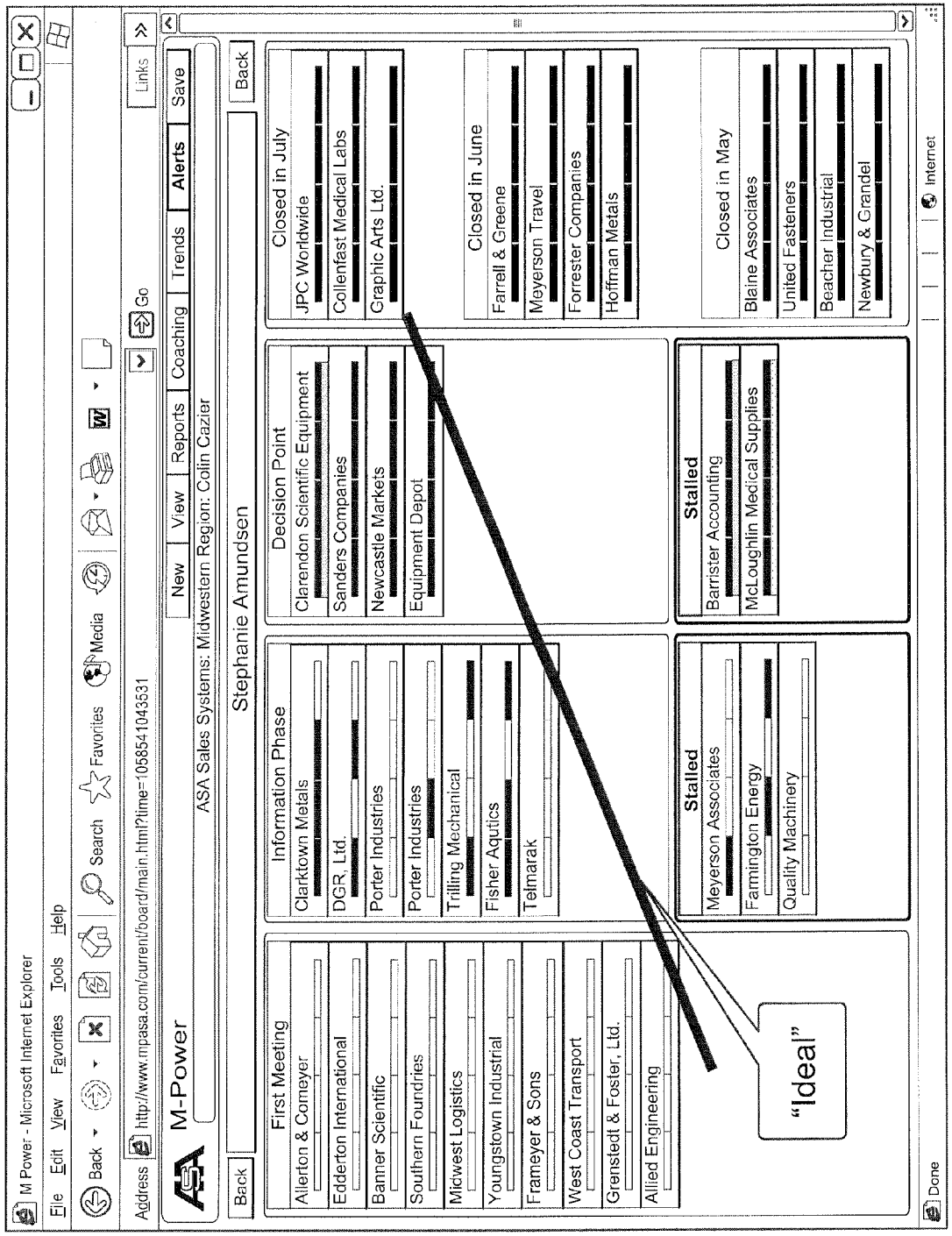
FIG. 15 illustrates an exemplary salesperson's performance curve.

These areas are the primary reference tools for analyzing and improving salesperson performance. The sales manager should heavily utilize the analysis section. This section facilitates conversations between managers and salespeople. It can be utilized during individual or group sales meetings. A salesperson's analysis is based upon their "activity curve," which is the imaginary line drawn between the bottommost opportunities in the First Meeting, Information Phase, Decision Point and Closed columns. The "ideal" curve is a relatively straight line running from the lower left to the upper right portions of the board from First Meeting to Closed, as shown in FIG. 15.

This curve indicates that a salesperson is moving an acceptable number of opportunities through the sales cycle, and is maintaining an adequate number of First Meetings to achieve consistent future results. While this ideal curve is desired, most salespeople do not have an adequate amount of real activity necessary to achieve it.

A salesperson's system curve is a strong predictor of future success. In visualizing the curve, the manager and salesperson can quickly see if the quantity of activity is sufficient to achieve success within the current sales cycle.

The system identifies a variety of individual curve possibilities, and bases questions and actions on them. The curves are separated in two groups, one for new salespeople and one for experienced salespeople. Regardless of the salesperson's overall sales experience, it is recommended that they be considered new for approximately two normal sales cycles or one year in a sales capacity at the company, whichever occurs sooner. While the displayed curves are identical in both groups, their meanings can be substantially different based upon the tenure of the salesperson.

Viewing a Salesperson's Coaching Report

Figure 16:
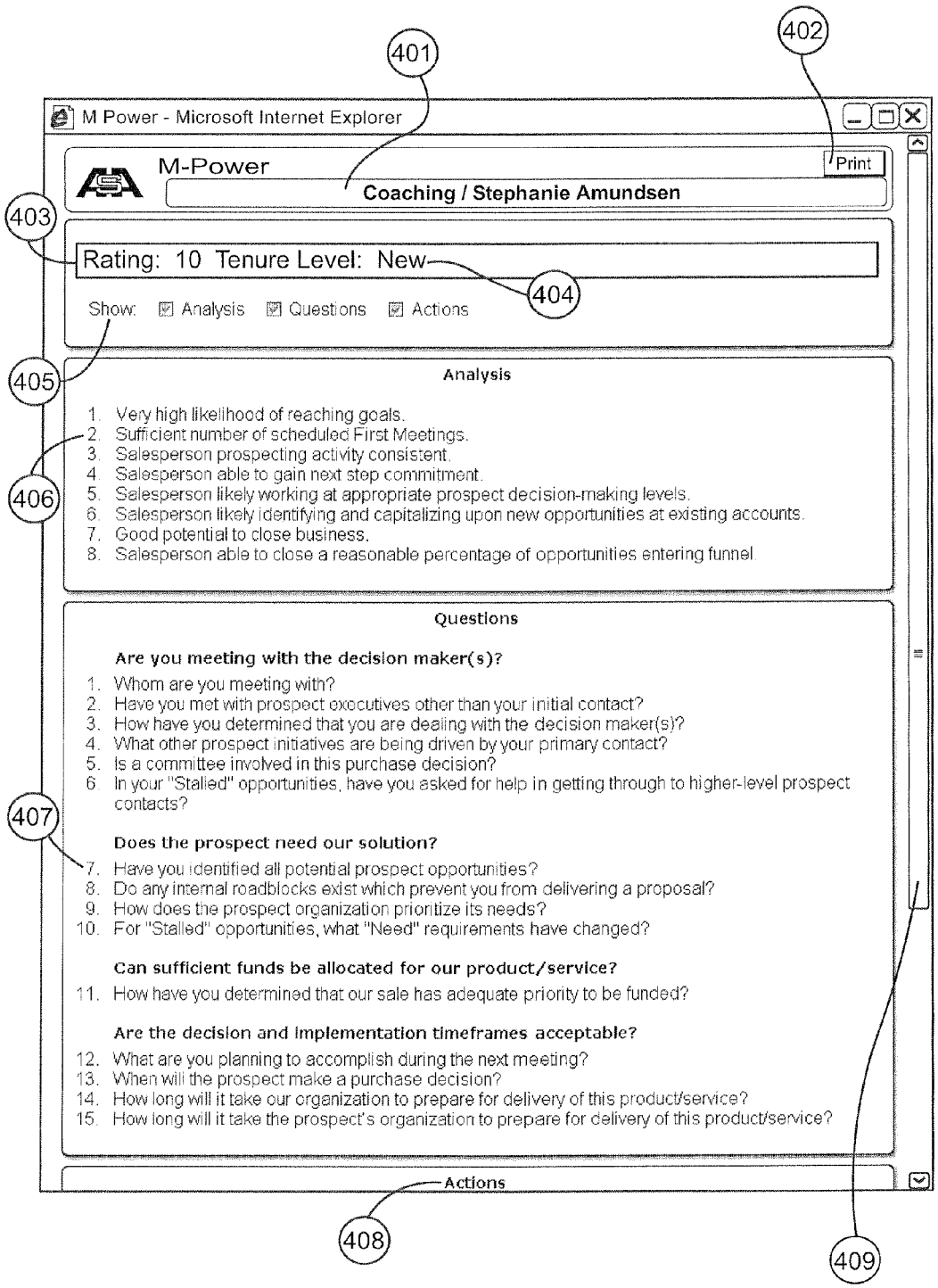
FIG. 16 illustrates an exemplary screen shot for analyzing a salesperson.

To view the analysis of an individual salesperson, click the "Coaching" button at the top right of the Manager's view. A pop-up window will then allow you to select the salesperson for whom to produce the report. Upon selection, the screen shown in FIG. 16 will be produced.

Coaching Key

401) Salesperson Name—The name of the salesperson for whom you requested the analysis.

402) Print Button—Clicking this button produces a printed version of this view. The manager can select the area(s) for printing through the use of the "show" boxes as described below. (405)

403) Rating—The system ranks the salesperson's funnel on a scale of 1-10, and displays the result in this area. The rating is useful in comparing funnels among sales team members, and setting individual activity expectations. The system utilizes the company-specific "Threshold" settings to define acceptable quantities of opportunities. These thresholds are compared to actual performance for the purpose of developing the salesperson's rating.

404) Tenure Level—Identifies if a salesperson is "new" or "experienced" in their current position. The system rates salespeople differently based upon their tenure. A company-defined number of months is utilized to define the length of time that a salesperson is considered "new". People in that category are rated more leniently than experienced" users.

405) Show—Clicking these boxes displays or hides specific areas of the analysis. This is particularly helpful for sharing certain elements of the analysis with a salesperson, without having to show other elements.

406) Analysis—A listing of key sales funnel attributes and probable causes. This analysis varies by sales funnel configuration, and provides a manager with potential root causes for the displayed sales funnel. These are areas that the manager should examine when reviewing current performance, and can point to specific areas of job performance that need enhancement.

407) Questions—Based upon the funnel configuration, the system generates specific questions to help the manager determine the validity of specific opportunities. Questions are categorized by "milestone", and represent those areas of prospect discovery that are most likely to assist the salesperson in qualifying, advancing and closing business. It is important to note that many questions are repeated throughout the system. They simply have importance for salespeople of various rankings. Some questions, however, are unique to individual curves. It is not expected that a manager will ask all recommended questions of the salesperson. The manager can select those questions determined most appropriate for the situation. They provide logical starting points for sales manager/salesperson discussions. Based upon the salesperson ranking, it is expected that the sales manager will examine every opportunity to varying degrees. It is recommended that the sales manager attempt to ascertain the depth of prospect information required in the answers to these questions. Each question represents an opportunity to learn important information about the prospect that can determine the reality of the opportunity, and point salespeople towards specific areas of the prospects buying process in their efforts to qualify and advance.

Many salespeople will be unable to answer the questions presented. If this is the case, the salesperson should ask these questions during the next prospect meeting. The act of doing so will enable the salesperson to better ascertain each situation, and obtain more information that will give themselves the best chance of moving the opportunity to "Closed". Additionally, the questions will more quickly qualify out those opportunities that have a very low likelihood of success. This will allow the salesperson to concentrate efforts on those prospects that have the best likelihood of success. The overall effect is to elevate the salesperson's selling skills.

It is important that the sales manager not ignore highly ranked salespeople. Opportunities on those curves ranked closer to "perfect" should always be verified and validated. They simply do not require the depth of questioning appropriate for lower ranked salespeople.

408) Actions (not shown in example above, but usually seen by scrolling down the Analysis window)—Specific recommendations for the sales manager to take with this salesperson. Where performance is not up to expectations, the system provides suggestions regarding personal involvement, expectation setting and ongoing management. These are specific recommendations for coaching and mentoring to undertake with a salesperson in this situation. It should be used to set specific expectations of the salesperson for as long as the curve is applicable. There are generally more actions for lower ranked salespeople.

Figure 17:
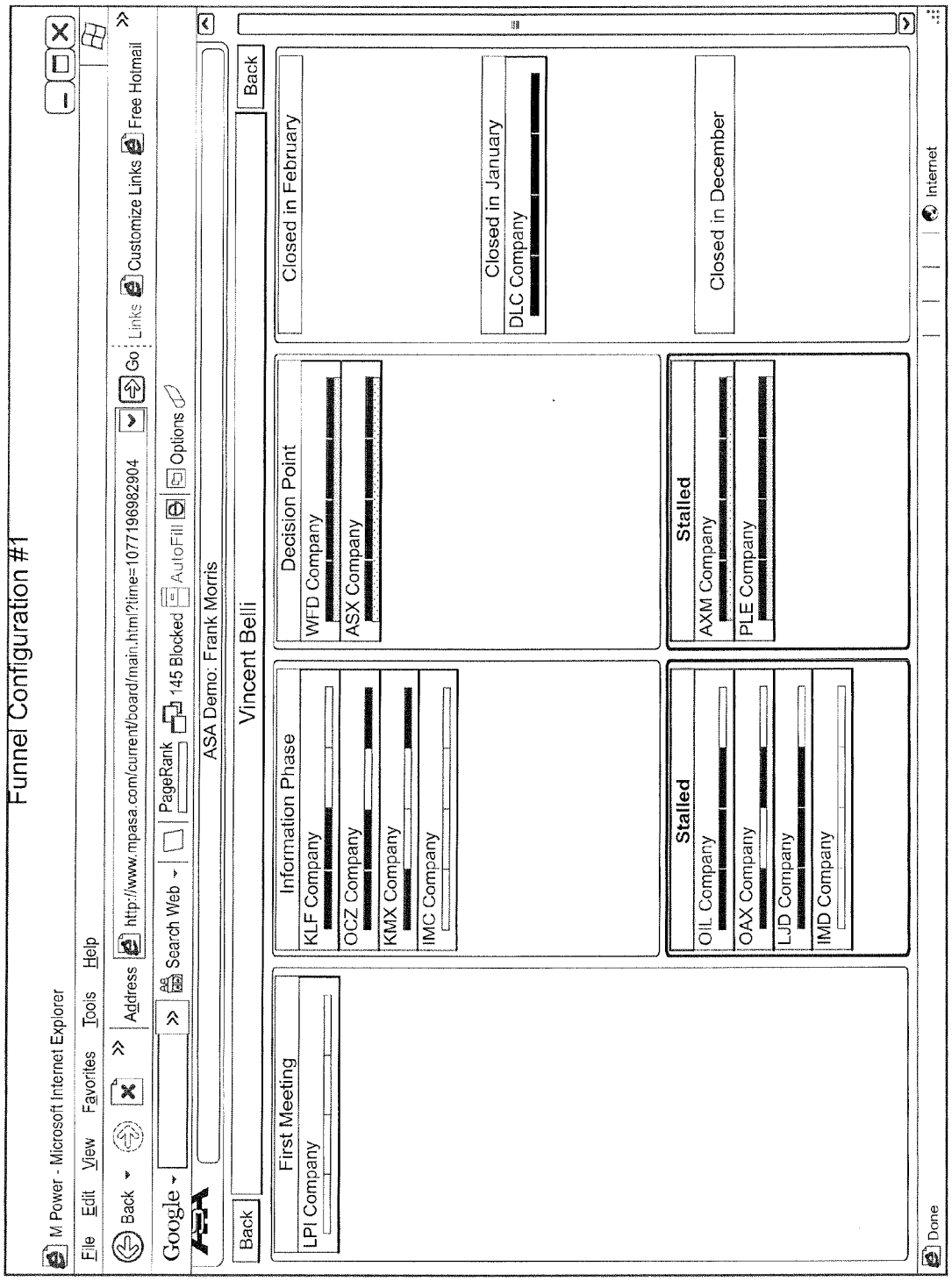
Figure 20:
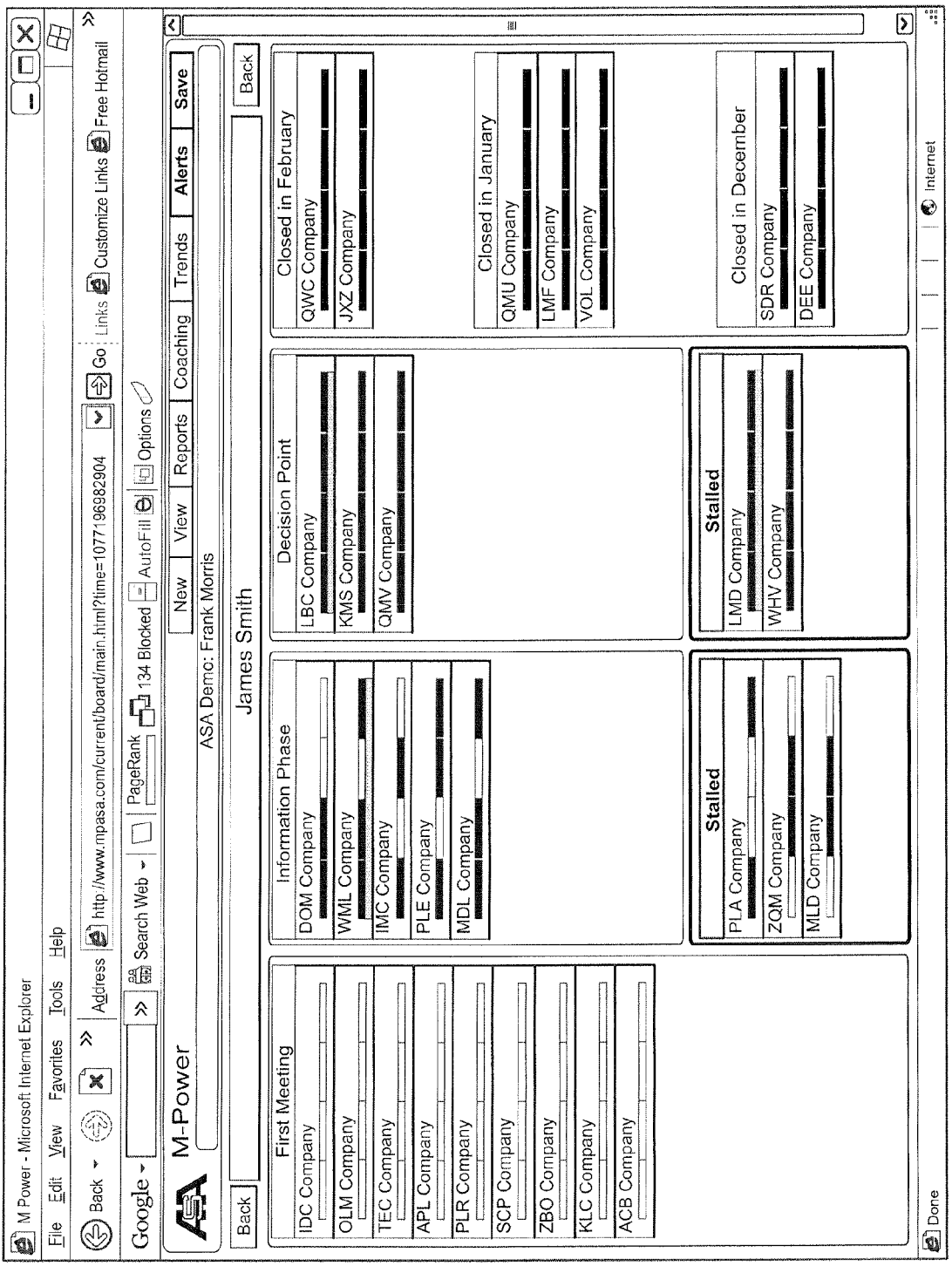
Figure 23:
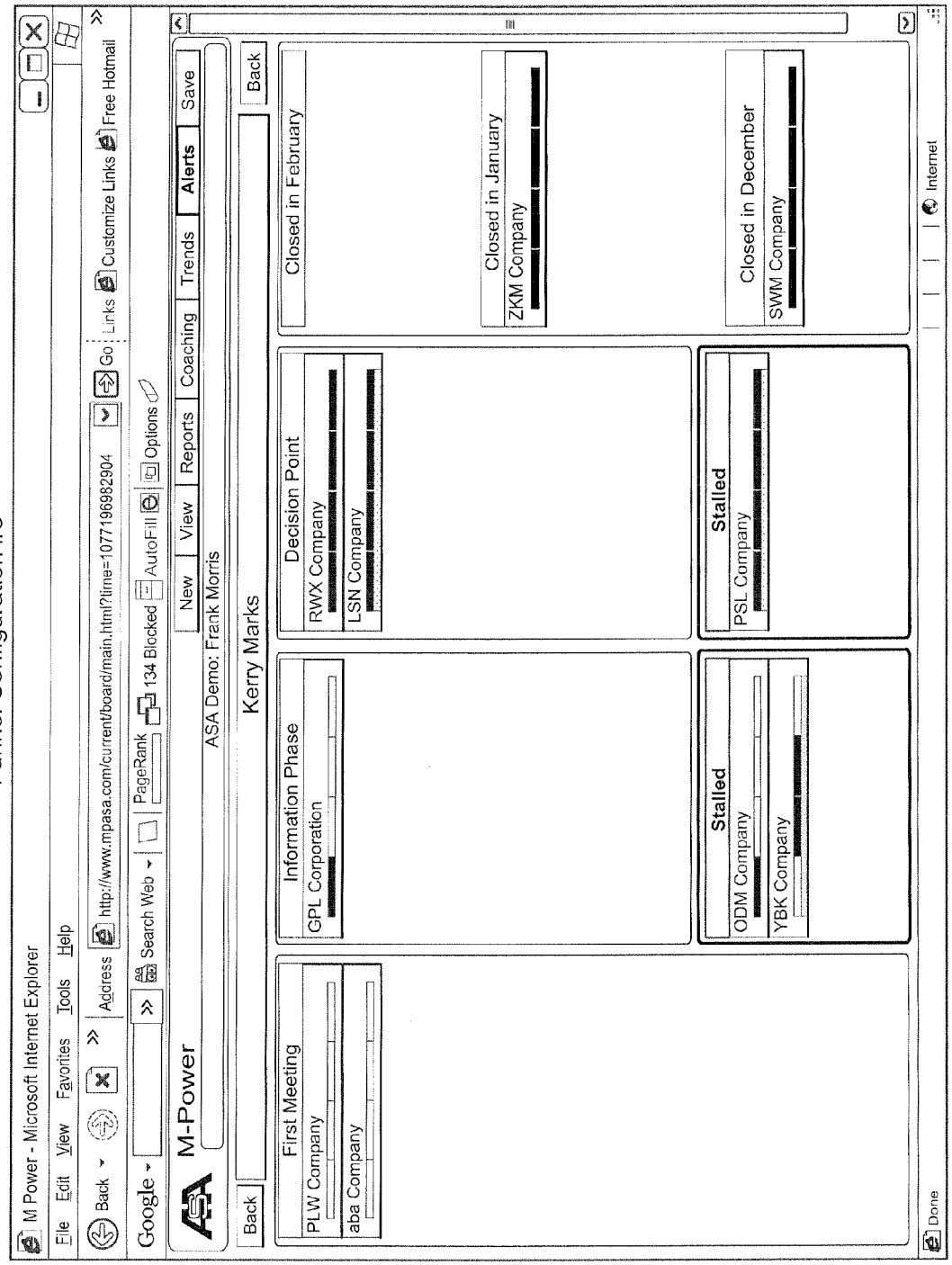

FIGS. 17-25 illustrate exemplary activity curves for different sales associates and the respective coaching reports for each. More particularly, FIG. 17 shows a first exemplary configuration, and FIGS. 18-19 show the coaching report; FIG. 20 shows a second exemplary configuration, and FIGS. 21-22 show the coaching report; and finally, FIG. 23 shows a third exemplary configuration, and FIGS. 24-25 show the coaching report.

Coaching Tool

The system coaching tool compares expected sales activity to actual sales activity for an individual salesperson, then provides, where applicable, potential reasons as to why actual activity differs from the expected. Specific questions that can be posed from a sales manager to a salesperson, and possible tactical managerial actions to drive salesperson improvement, are provided. Sales activity is defined as the quantity of sales opportunities that qualify for inclusion within the First Meeting, Information Phase, Decision Point and Closed columns of the system.

Expected sales activity (the quantity of opportunities qualifying for each column) is entered for each salesperson through a system administration function. (See Administrator's Guide—Page 6, "Thresholds".) The actual quantity of opportunities within each column appears on a salesperson's "board" is continually compared to the expected sales activity. Each column is assigned a numeric score from 0 to 3 based upon the following:

| Score | Meaning |
| --- | --- |
| 0 | Actual column quantity = zero |
| 1 | Actual column quantity < .66 of expected column quantity |
| 2 | Actual column activity >= .66 and < 1.5 of expected column quantity |
| 3 | Actual column quantity >= 1.5 of expected column quantity |

The resulting combination of column values determines a "score", such as 2-1-0-3, 3-3-3-1-2, 0-2-0-1, 1-1-3-1, etc. Each of these "scores" is predictive for sales success within the salesperson's normal sales cycle. The score of 3-3-3-3, which indicates activity greater than 1.5x the activity expectations for that salesperson, is the best possible score. Predictably, the score of 0-0-0-0 is the worst possible score. Others have been ranked according to their indication of success within the normal sales cycle.

Certain combinations (0-0-0-3, 0-0-3-0, 3-3-0-3, etc.) that are considered "highly unlikely" in the normal course of sales activity were eliminated from the rankings. In total, there are 142 combinations of scores used by the system.

Each score was analyzed for potential causes of its difference from the "perfect" curve of 3-3-3-3. Specific analysis, questions and actions are provided to the manager for the purpose of driving salesperson activity toward that represented by the "perfect" curve.

Viewing a Salesperson's Trends

The Trends area deals with individual trends that make up the overall curve. A trend is defined as a particular pattern visible within a single board column, or within the movement of opportunities between adjacent columns. The system trends are always considered negative, and indicate specific skill issues for the manager to address. Most trends represent glaring discrepancies between the expected progress and actual performance.

While the system board provides a "snapshot" of current salesperson activity, the Analysis and Trends areas assist the manager in improving each salesperson's activity picture. It is crucial to continually verify the validity of all populated opportunities. Every opportunity on the board must have a valid, calendared next step. Those without solid appointments need to be placed in the appropriate "Stalled" column, or off the board entirely, based upon the system rules. Opportunities where the next step has been pushed back multiple times should be treated suspiciously. This may be an indication that the salesperson is more interested in making the system board look good than in improving their real sales activity.

At this point is important to reflect on the true meaning of the board. It is merely a reflection of a salesperson's selling activity. The board is a dynamic visualization tool, and is only as valid as the last sales call. While the overall picture may not be as pretty as a sales manager or salesperson would like, it is important that the picture be real; otherwise, the system is useless. The manager and salesperson need to base their conversations and activities on reality.

Figure 26:
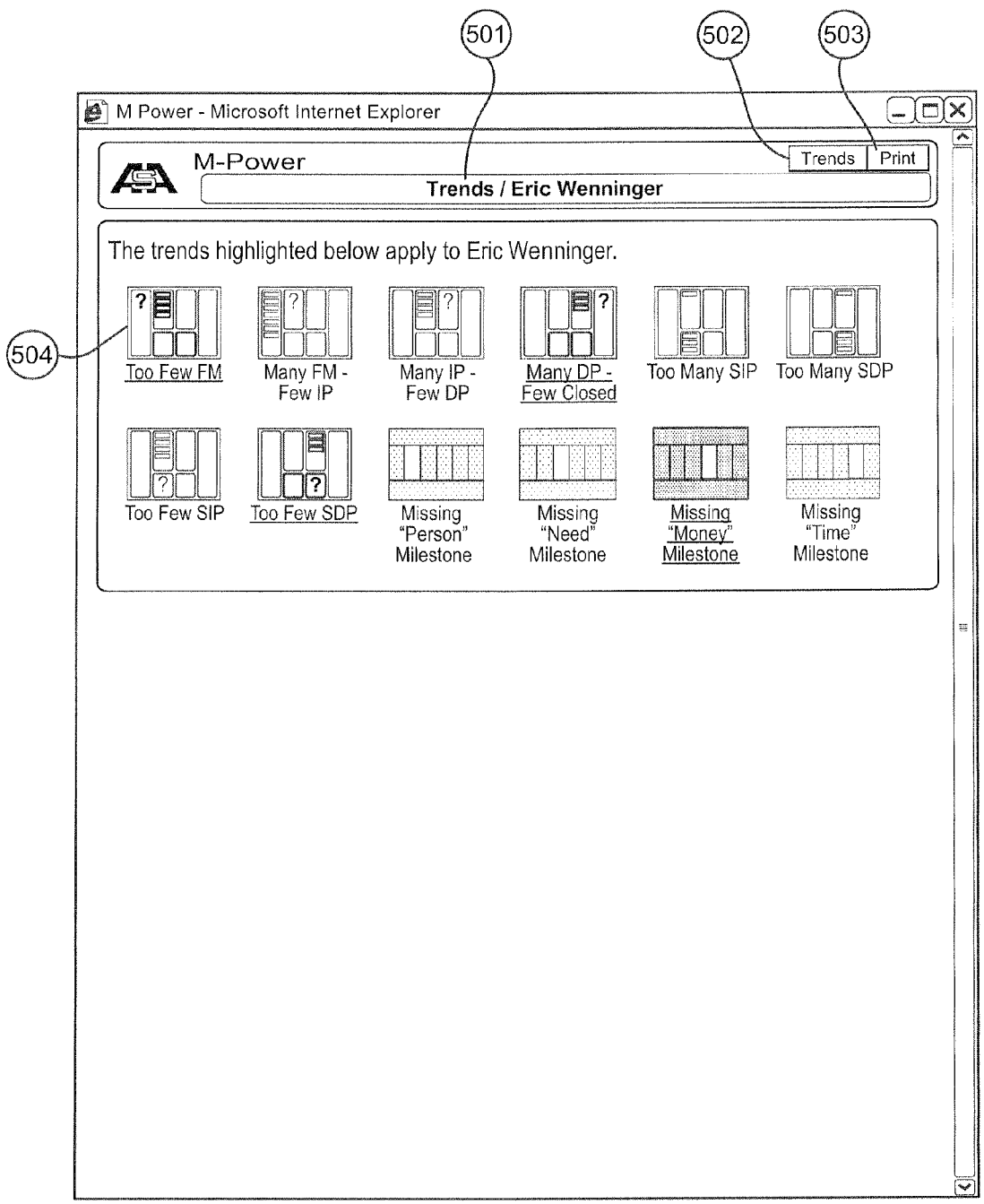
FIG. 26 illustrates an exemplary management screen showing salesman trends.

To view the trends of an individual salesperson, click the "Trends" button at the top right of the Manager's view. A pop-up window will then allow you to select the salesperson for whom to produce the analysis. If you choose "All Salespeople" from this selection window, a scrollable screen will display only the trends currently applicable for each salesperson. Upon selection of a specific salesperson, the screen shown in FIG. 26 will be produced.

All possible trends are displayed. Those that are highlighted (in the selected salesperson's color) apply to the salesperson at this point in time. Clicking on any trend produces a page of information regarding potential causes of the trend, questions for the salesperson regarding the situation and specific actions for the manager to take to reverse the situation.

Trends Key

501) Salesperson Name—The name of the salesperson for whom you requested the trends.

502) Trends Button—Clicking this button brings you back to the salesperson's selection screen for trends.

503) Print—Clicking this button produces a printed version of this view.

504) Possible Trends—As mentioned above, all system trends are displayed. Those that apply to this salesperson at this time are highlighted. Possible trends are:

a. Too few FM—This trend indicates that the current number of First Meeting opportunities is less than the First meeting threshold for this salesperson.

b. Many FM-Few IP—This trend indicates that the salesperson has an adequate number of First Meeting opportunities, but is not moving a sufficient number of them into the Information Phase category.

c. Many IP-Few DP—This trend indicates that the salesperson has an adequate number of Information Phase opportunities, but is not moving a sufficient number of them into the Decision Point category.

d. Many DP-Few Closed—This trend indicates that the salesperson has an adequate number of Decision Point opportunities, but is not moving a sufficient number of them into the Closed category.

e. Too Many SIP—This trend indicates that the salesperson has too many "Stalled-Information Phase" opportunities based upon the number of opportunities within the "Information Phase" category.

f. Too Many SDP—This trend indicates that the salesperson has too many "Stalled-Decision Point" opportunities based upon the number of opportunities within the "Decision Point" category.

g. Too Few SIP—The salesperson has too few "Stalled-Information Phase" opportunities based upon the number of opportunities within the "Information Phase" category.

h. Too Few SDP—The salesperson has too few "Stalled-Decision Point" opportunities based upon the number of opportunities within the "Decision Point" category.

i. Missing "Person" Milestone—A high percentage of Information Phase opportunities for this salesperson are missing the "Person" milestone.

j. Missing "Need" Milestone—A high percentage of Information Phase opportunities for this salesperson are missing the "Need" milestone.

k. Missing "Money" Milestone—A high percentage of Information Phase opportunities for this salesperson are missing the "Money" milestone.

l. Missing "Time" Milestone—A high percentage of Information Phase opportunities for this salesperson are missing the "Time" milestone.

m. Company-Specific Milestone(s) (if used)—The system clients can have one or two additional milestones to accommodate their selling requirements. If utilized, these trends will indicate that a high percentage of Information Phase opportunities are missing them for this salesperson.

In reviewing the board, the sales manager should always be conscious of the individual trends that make up the overall curve. They pinpoint the key individual points within the sales cycle where a salesperson may be falling short of expectations. Movements of opportunities from one section of the board to another occur at critical points of the selling process. Often a salesperson does well within certain points of the sales cycle, but struggles in others. Noticeable drop-offs between adjacent columns need to be analyzed and acted upon. The Trends section of the system contains individual, detailed analyses of these opportunity advancement issues, and provides recommended questions for the sales manager to ask a salesperson in an effort to remedy the situation.

An additional Trends area for examination involves the attainment of Milestones within the Information Phase column. As has been detailed earlier in this document, the salesperson undertakes a process of discovery with the prospect, during which the key Milestone information is gathered. Upon attainment of all Milestones, the salesperson has the most likelihood of closing the business, and should ask for an order at that time. A salesperson, however, may do a better job of attaining particular milestones than others.

Each opportunity should be continually updated with the Milestones that have been achieved. The system scans down each salesperson's Information Phase opportunities, looking for a consistent pattern of missing milestones. This indicates a specific coaching or mentoring opportunity for the sales manager. The last four trends cover likely reasons for this pattern, and provide specific questions for the sales manager to use in addressing these issues.

Trends Tool

The Trends tool identifies specific progress areas within the sales cycle that a salesperson is consistently having difficulty attaining. Progress is determined in three areas:

1) The salesperson's ability generate a sufficient quantity of opportunities, and to move a sufficient number of opportunities from one of the following columns of the system sales cycle to the one on its immediate right:

First Meeting

Information Phase

Decision Point

2) The salesperson's ability to consistently attain system Milestones while an opportunity is in the Information Phase column of the system.

3) The salesperson's ability to either move opportunities from the Information Phase Stalled or the Decision Point Stalled columns to another area of the system board or recognize that they are not viable sales opportunities and remove them from the aggregation of opportunities that the salesperson considers have potential for closing within the normal sales cycle.

The mechanism identifying a Trend for area 1 above involves a comparison of the quantity of opportunities in one of the columns listed above to the quantity of opportunities in the column on its immediate right. An additional factor for determining the validity of a Trend involves the salesperson-specific "Threshold" value for columns as defined through a system administration function. This factor is also the primary driver of one of the Trends (too few first meetings). The following details specific results of comparisons that trigger a Trend, and its applicable Trend category:

| Result | Trend |
|---|---|
| Quantity of opportunities within the First Meeting column is less than the "First Meeting" Threshold for the salesperson | Too Few First Meetings |
| Quantity of opportunities within the Information Phase column is less than or equal to 20% of the quantity of opportunities within the First Meeting column, and the quantity of opportunities within the First Meeting column is >= 75% of its assigned Threshold | Many First Meetings - Few Information Phase |
| Quantity of opportunities within the Decision Point column is less than or equal to 20% of the quantity of opportunities within the Information Phase column, and the quantity of opportunities within the Information Phase column is >= 75% of its assigned Threshold | Many Information Phase - Few Decision Point |
| Quantity of opportunities within the Closed column is less than or equal to 20% of the quantity of opportunities within the Decision Point column, and the quantity of opportunities within the Decision Point column is >= 75% of its assigned Threshold | Many Decision Point - Few Closed |

The mechanism for identifying trends for area 2 above involves calculating the percentage of specific Milestone categories attained for the aggregate opportunities listed in the salesperson's Decision Point column. For each Milestone category (four system-defined and two client-defined) the quantity of opportunities within the Information Phase and Stalled—Information Phase columns in which the Milestone has been attained is compared to the total number of opportunities found in the Information Phase and Stalled—Information Phase columns. An additional factor for determining the validity of these Trends involves the salesperson-specific "Threshold" value for columns as defined through a system administration function. If the quantity of opportunities in which the Milestone has been attained is <=25% of the total number of opportunities, and the total number of opportunities is >=75% of the Threshold, a specific Trend is generated for the salesperson. Possible Trends are:

Missing "Person" Milestone

Missing "Need" Milestone

Missing "Money" Milestone

Missing "Time" Milestone

Two additional Trends described by client-defined optional Milestones

The mechanism identifying a Trend for area 3 above involves a comparison of the quantity of opportunities in the "Stalled—Information Phase" or "Stalled—Decision Point" columns to the quantity of opportunities in the Information Phase or Decision Point columns. An additional factor for determining the validity of these Trends involves the salesperson-specific "Threshold" value for columns as defined through a system administration function. (See Administrator's Guide—Page 6, "Thresholds".) The following details specific results of comparisons that trigger a Trend, and its applicable Trend category:

| Result | Trend |
| --- | --- |
| Quantity of opportunities within the Stalled Information Phase column is greater than or equal to 80% of the quantity of opportunities within the Information Phase column, and the quantity of opportunities within the Information Phase column is >= 75% of its assigned Threshold | Too Many Stalled - Information Phase |
| Quantity of opportunities within the Stalled-Decision Point column is greater than or equal to 80% of the quantity of opportunities within the Decision Point column, and the quantity of opportunities within the Decision Point column is >= 75% of its assigned Threshold | Too Many Stalled - Decision Point |

In the normal course of sales activity, it is anticipated that a reasonable quantity of opportunities will be "Stalled" at any given time. A salesperson's willingness to properly categorize them as such can be measured as the percentages of the quantities of Stalled—Information Phase and Stalled—Decision Point opportunities to the quantities of Information Phase and Decision Point opportunities. An additional factor for determining the validity of these Trends involves the salesperson-specific "Threshold" value for columns as defined through a system administration function. The following details specific results of comparisons that trigger a Trend, and its applicable Trend category:

| Result | Trend |
| --- | --- |
| Quantity of opportunities within the Stalled-Information Phase column is less than or equal to 25% of the quantity of opportunities within the Information Phase column, and the quantity of opportunities within the Information Phase column is >= 75% of its assigned Threshold | Too Few Stalled - Information Phase |
| Quantity of opportunities within the Stalled-Decision Point column is greater than or equal to 25% of the quantity of opportunities within the Decision Point column, and the quantity of opportunities within the Decision Point column is >= 75% of its assigned Threshold | Too Few Stalled - Decision Point |

The system contains a menu of all potential Trends for a salesperson, and highlights those that meet the criteria as described above. Separate strategic and tactical advice has been prepared for all system-generated Trends. The system also contains a mechanism for entry and display of advice for client-defined optional Milestone Trends.

Alerts

Figure 27:
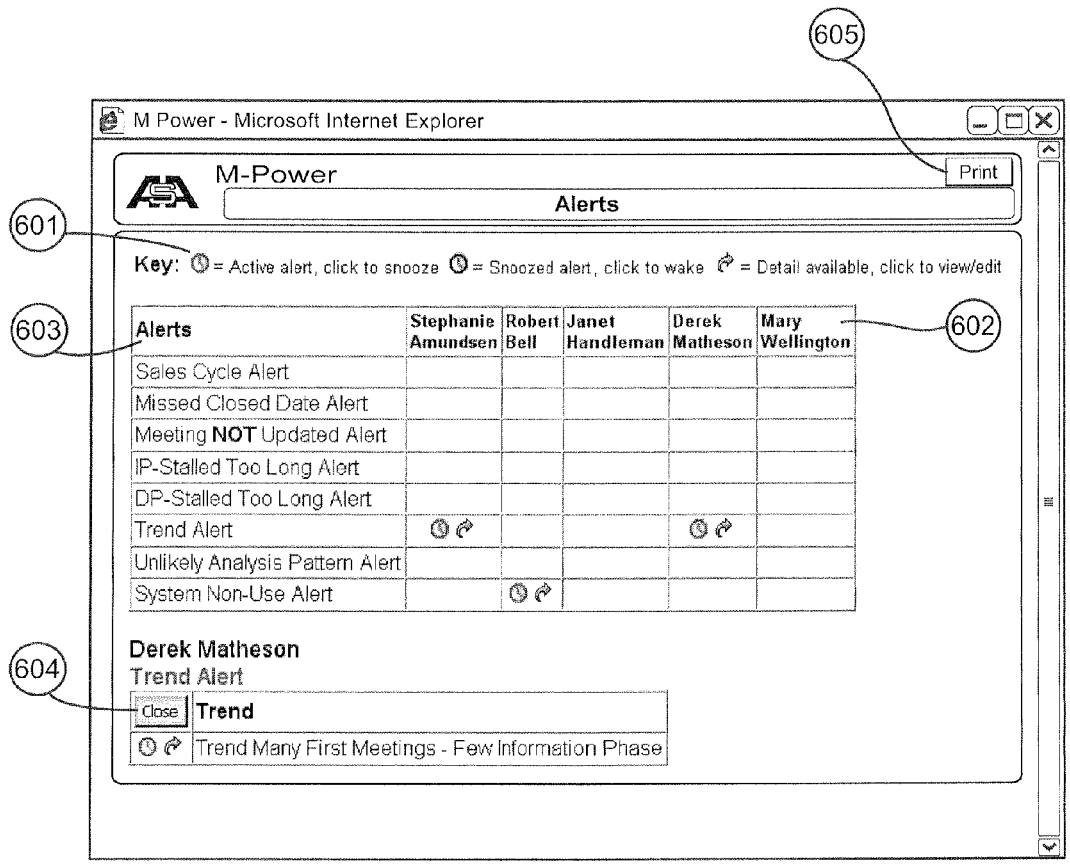
FIG. 27 illustrates an exemplary Alert screen.

The system continually examines the opportunities present for each salesperson, and alerts management to situations that may warrant further review. If any of these situations exist for a member of a manager's team, the "Alert" button in the upper right corner of the Manager's board will illuminate in red. Clicking that button brings up the screen of FIG. 27.

Alert View Key

601) Key—Indicates the meanings of symbols of the view. A red "Clock" icon indicates active alerts. The manager can to turn off (snooze) any alert for up to 14 days. If this option is chosen, the red icon is changed to black. Snoozed alerts do not trigger the illumination of the "Alert" button in the Manager's view. The "Edit Arrow" icon permits the user to see alert detail, which is displayed at the bottom of the view.

602) Salespeople—All salespeople for this manager are given a column, with applicable alerts indicated by the "Clock" icon.

603) Alerts—All possible system alerts are listed. They are:

Sales Cycle Alert—Indicates that one or more of the salesperson's opportunities have extended past normal sales cycle length. On the Manager's and Salesperson's views, colored boxes will appear on each applicable opportunity as follows:

Red-Alert Box—This red box indicates that an opportunity is extending well past its normal sales cycle. The system records the actual sales cycle lengths (First Meeting date to Closed date) for all closed opportunities of each product type. If this opportunity's sales cycle length is currently longer than a company-selected percentage of all opportunities of this product type that have closed, (generally 80%) the Red-Alert box will appear. For the manager, this example indicates that 80% of all opportunities for this product closed in a period of time that was shorter than this opportunity has been open.

Yellow-Alert Box—Similar in purpose to the Red-Alert Box described above. The Yellow-Alert has a lower threshold for percentage of closed opportunities for the product type (generally 60%). This example indicates that 60% of all opportunities for this product closed in a period of time that was shorter than this opportunity has been open. While not as serious as the Red-Alert, it does tell a manager that the opportunity is older than most of its type that have Closed, and should be watched.

Missed Close Date Alert—The system calculates an anticipated close date for each opportunity based upon the average sales cycle length for the product and salesperson, as well as the First Meeting date. Opportunities that have extended past the anticipated close date generate this alert.

Meeting Not Updated Alert—The system administrator sets a "grace period" following any scheduled meeting for the salesperson to update the opportunity. This alert is generated if one or more opportunities are past their scheduled meeting date by a number of days greater than this grace period.

IP-Stalled Too Long Alert—The system administrator sets a number of consecutive days that an opportunity can reside in the "Stalled—Information Phase" column. This alert is generated if one or more opportunities have been in that column for a greater number of days.

DP-Stalled Too Long Alert—The system administrator sets a number of consecutive days that an opportunity can reside in the "Stalled—Decision Point" column. This alert is generated if one or more opportunities have been in that column for a greater number of days.

Trend Alert—Indicates that one or more system "Trends" currently applies to the salesperson. Managerial guidance regarding these trends are accessible via the "Trends" button on the Manager's view.

Unlikely Analysis Pattern Alert—Over 140 individual sales funnel configurations are defined and analyzed within the system. Occasionally, a sales funnel is entered that falls outside of these configurations. They should be considered suspect, and immediate management attention should be given on validating and verifying the viability of every opportunity.

System Non-Use Alert—The system administrator sets a "grace period" for the number of days a salesperson can go without logging into the system. This alert is generated if the salesperson has not logged into the system for a number of days greater than this grace period.

604) Alert Detail—Clicking on the "Edit Arrow" icon for any applicable salesperson's alert generates specific information regarding that alert. This area links you (through an additional "Edit Arrow") to specific Opportunity, Analysis and Trends information from which the alert was generated.

605) Print—Clicking the "Print" button generates a printed copy of this view.

Sales Cycle Alert

The system utilizes the following methodology to alert users that specific sales opportunities have aged beyond their normal sales cycle.

1) Specific, client-defined Offerings are established within the system for assignment to each Opportunity. An Offering represents the client product or service for which the selling attempt is being made. Each Offering has two values that relate to the Sales Cycle Alert:

a) Default Sales Cycle—A client-determined average number of days that it takes to close a sale for this product.

b) Alert Percentages—Values that are used to identify board opportunities that have been in existence longer than the norm for their Offering. These fields are filled in as follows:

Yellow—The percentage that is used to trigger the "Yellow Alert". This appears as a yellow bar across the opportunity in the Manager's and Salesperson's board, and as a "Sales Cycle Alert" in the Alerts section. The default value is 60%, meaning that the opportunity will be given the alert if the number of days since the First Meeting is more than the total number of days needed to close a sale by 60% of Closed opportunities. This field can be modified to any percentage desired by the client.

Red—The percentage that is used to trigger the "Red Alert". This appears as a red bar across the opportunity in the Manager's and Salesperson's board, and as a "Sales Cycle Alert" in the Alerts section. The default value is 80%, meaning that the opportunity will be given the alert if the number of days since the First Meeting is more than the total number of days needed to close a sale by 80% of Closed opportunities.

The average sales cycle (for a particular salesperson) for each Offering is calculated by taking the average of the sales cycle lengths (in days) for its last thirty sales (by that salesperson). The largest three values and lowest three values of the thirty are not utilized for the average. At system implementation, the thirty values are filled with the Default Sales Cycle for that opportunity. For every opportunity that reaches the Closed column, one of the Default Sales Cycle entries is replaced with the actual sales cycle for that sale. After the initial thirty sales of an Offering by the salesperson, the oldest opportunity's sales cycle is replaced with the newest one. In this way the system will, over time; "learn" the actual number of days to close and change the value used accordingly.

The system will calculate the average number of days that it takes a salesperson to close the percentage of opportunities defined in the Yellow Alert described above. If any current opportunity has a sales cycle length greater than this, a Yellow Alert will be applied to the opportunity. The system will perform the same calculation for the Red Alert, applying it to any current opportunity with a sales cycle length longer than the number of days that it takes to close the percentage of opportunities defined in the Red Alert above. The Red Alert supersedes the Yellow Alert.

On-Going System Management

While proper implementation is important, the true value of the system will be realized in the weeks and months ahead. The sales manager and salesperson must focus on the behavioral changes recommended by the system. One must always remember that the system is not just the visualization of a funnel. The salesperson's picture changes with each new First Meeting scheduled and every opportunity moved on and off the board. The proper quantity and quality of sales activity will drive success, and with that activity the board will take care of itself.

The sales manager should adhere to the rules and criteria. It is tempting to modify the rules and opportunity criteria in an effort to make the board look "better." This, however, undermines its value.

The Coaching and Trends sections should be utilized to facilitate conversations between the manager and the salesperson. The questions should be viewed as a logical starting point for discussions of individual opportunities, and for strategizing the most appropriate areas of activity and support. It may be utilized in both individual and group meetings.

Finally, it is important to remember that the implementation of the system is not an event, but rather the beginning of a new sales process. With this process in place, and the commitment of consistent activity to create consistent success, a sales team can achieve greater results than could otherwise have been imagined.

To assist in the management and tracking of sales information, various reports may be forwarded to users. For example, the following reports may be forwarded to users:

1. Path Active Report—This report describes how sales opportunities move and are tracked throughout the software application 30. Each opportunity has a chronology including board location, number of days in that location and other key data that helps a sales manager discern actual progress. Total sales cycle days, along with the average sales cycle for that opportunity type are also shown. Key dates may include the First Meeting Date, the Most Recent Meeting Date and the Next Meeting Date.

2. Change Report—This report documents the most recent update of all sales opportunities for a salesperson or user. It may be used by a manager to verify and validate that sales activity is happening on a consistent basis, and that the system reflects that effort.

3. Forecast Report—This report shows anticipated revenues by month and by product category. When the system is implemented, client-selected percentages are entered into the "Default Close Ratio" fields of the Administration area. The software application 30 utilizes these fields as multipliers. These multipliers are applied to the dollar value of opportunities residing in the "Information Phase" and "Decision Point" columns, and produce weighted dollar amounts that are summarized on this listing. Default average sales cycle days for all products are input through the Administration area. These days are used to determine the appropriate time period in which to populate the weighted dollar amount. Actual percentages of sales for each sales cycle category for products and salespeople will be learned over time, as will average sales cycle length. As these percentages are learned, they gradually replace the default values with actual values on this report.

4. Removed Opportunities Report—This report shows all sales opportunities for which a salesperson has performed the "Remove" function within the Edit Opportunity screen. At that time, a salesperson may select a "Removal Reason" from a client-built, drop-down listing. That reason may be displayed here, along with additional information regarding the opportunity.

5. Average Sales Cycle Report and Average Sales Cycle Summary Report—These reports simply show the average length of time it takes salespeople to close business in each product category. Information is stored by salesperson and by product category. The total number of actual sales cycle days for all sales within a product category is divided by the number of sales within the product category to produce the average sales cycle. The Average Sales Cycle report allows the manager to select an individual salesperson. The Summary report lists this information for all members of a sales team.

6. First Meeting Report—This report tallies and shows the number of First Meetings that have been scheduled by members of a sales team. Visualizations and comparisons may be made for meetings scheduled this month vs. last month, this quarter vs. last quarter and this year vs. last year. The second part of this report provides the "rank" for each salesperson regarding First Meeting scheduling performance for these same time periods.

7. Trend Detail Report—This report shows all active "Trends" in play for a selling organization. The listing shows all salespeople across the top, and possible trends listed down the left hand side of the report. Any currently active trends show the day the trend first appeared, and the number of days that it has been active.

8. Trend History Report—Produced by a salesperson, this report shows the trends for a particular salesperson throughout their sales history. Each possible trend may be listed on the left. The time period of each trend occurrence may also be detailed. This report may keep accumulating occurrences of trends for each salesperson. Managers may utilize this report to determine if individuals are returning to negative patterns of sales performance.

9. Trend Summary Report—This report shows how many members of their sales team are currently in each "Trend" category. Additionally, it may show the average number of days that each trend has been active for the team. Managers may utilize this report to help discern systemic issues with the sales team.

10. Updates Needed Detail Report—Produced by a salesperson, this report shows individual opportunities that are past due for updating. Every opportunity residing in First Meeting, Information Phase or Decision Point on the board must have a date and time for a future meeting. It is the salesperson's responsibility to update each opportunity as these meetings occur. A "grace period" may be established in the Administration area to give the salesperson adequate time to update the opportunity. Opportunities in which the next meeting date has passed beyond the grace period may also appear on this report. Other information about each opportunity may be listed.

11. Updates Needed Report—Similar in nature to the Updates Needed Detail Report, this report lists opportunities for all salespeople within the manager's selling team.

12. Use Report—This report may be produced for an entire sales team and shows the most recent date that each individual logged into the computer network 20. Additionally, it may provide information regarding the "Use Alert." The report will show how many days each individual is currently in the "Use Alert" status (if applicable). Additionally, it may show the number of times each individual has been in a "Use Alert" status for various time periods 13. Exemplary Funnel Configuration and Analysis—These screen shots show exemplary funnel configuration and corresponding analysis for individual sales people.

14. Administrator's Guide—This is a user's guide, which describes the processes and procedures related to user implementation, customization and administration of the software application 30. This guide is attached as an Appendix to this specification and is hereby incorporated by reference.

Although the foregoing Reports are fairly exhaustive, it should be appreciated that other reports may be desirable for managing or tracking sales information. Therefore, the foregoing list of Reports should not be viewed as limiting with respect to the number or type of Reports that may be provided by the software application 30 in the future.

While specific embodiments of the present invention have been described in detail, it will be appreciated by those skilled in the art that various modifications and alternatives to those details could be developed in light of the overall teachings of the disclosure. For example, the processes described with respect to computer executable instructions can be performed in hardware or software without departing from the spirit of the invention. Furthermore, the order of all steps disclosed in the figures and discussed above has been provided for exemplary purposes only. Therefore, it should be understood by those skilled in the art that these steps may be rearranged and altered without departing from the spirit of the present invention. In addition, it is to be understood that any patents discussed in this document are to be incorporated herein by reference in their entirety. Accordingly, the particular arrangement disclosed is meant to be illustrative only and not limiting as to the scope of the invention which is to be given the full breadth of the appended claims and any equivalents thereof.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method for managing sales activities of sales associates, the method comprising:
   (a) a server computer receiving sales information from a remote computer, the sales information including sales data relating to a status of a plurality of sales opportunities among each of the sales associates, each of the plurality of sales opportunities including multiple phases of a sale, wherein the server computer compiles the plurality of sales opportunities and defines a sales activity curve for each of the sales associates;
   (b) the server computer processing the sales information;
   (c) the server computer identifying weaknesses of the sales associates based on a respective one of the sales activity curve of each of the associates; and
   (d) the server computer in advice content for a manager to manage the sales associates based on the identified weaknesses of the sales associates.

2. A method according to claim 1, wherein step (c) is practiced by generating the activity curve based on the sales information from opportunity through closing.

3. A method according to claim 2, wherein the multiple phases of a sale comprise first meeting phase, information phase, decision phase, and closing phase, and wherein the sales activity curve is generated via a line according to the plurality of sales opportunities from the first meeting phase through the closing phase.

4. A method according to claim 3, further comprising identifying advice content based on a shape of the activity curve.

5. A method according to claim 1, further comprising comparing expected sales activity to actual sales activity for one of the sales associates, and identifying reasons for any deviation based on the sales information.

6. A method according to claim 5, further comprising identifying advice content based on the deviation reasons.

7. A method according to claim 6, wherein the multiple phases of a sale comprise first meeting phase, information phase, decision phase, and closing phase, and wherein the step of comparing expected sales activity to actual sales activity is practiced by assigning a numeric score for each of the phases of a sale, the numeric score being indicative of sales success.

8. A method according to claim 7, wherein each phase is assigned a numeric score from 0 to 3 based upon the following:

| Score | Meaning |
| --- | --- |
| 0 | Actual phase quantity = zero |
| 1 | Actual phase quantity < .66 of expected phase quantity |
| 2 | Actual phase activity >= .66 and < 1.5 of expected phase quantity |
| 3 | Actual phase quantity >= 1.5 of expected phase quantity. |

9. A method according to claim 1, further comprising generating alerts based on the sales information.

10. A method according to claim 9, wherein the step of generating alerts is practiced by generating an alert when an actual sales cycle time exceeds a normal sales cycle time by a predetermined percentage.

11. A method according to claim 9, wherein the multiple phases of a sale comprise first meeting phase, information phase, decision phase, and closing phase, and wherein the step of generating alerts is practiced by generating alerts based on a comparison of a number of opportunities in one phase to a number of opportunities in a later phase.

12. A sales management system comprising:
   a server computer; and
   a remote computer storing sales information of at least one sales associate, the remote computer being electronically connected to the server computer and communicating the sales information to the server computer, the sales information including sales data relating to a status of a plurality of sales opportunities among each of the sales associates, each of the plurality of sales opportunities including multiple phases of a sale, wherein the server computer compiles the plurality of sales opportunities and defines a sales activity curve for each of the sales associates,
   wherein the server computer comprises processing structure that processes the sales information and identifies weaknesses of the sales associates based on a respective one of the sales activity curve of each of the associates, the processing structure generating content-based advice for a manager to manage the sales associates based on the identified weaknesses of the sales associates.

13. A sales management system according to claim 12, wherein the remote computer is connected with the server computer via a global network.

14. A computer program embodied on a computer readable medium for managing sales activities of sales associates, the computer program when executed by a computer processor implementing the following steps:
   (a) receiving sales information from a remote computer, the sales information including sales data relating to a status of a plurality of sales opportunities among each of the sales associates, each of the plurality of sales opportunities including multiple phases of a sale, wherein the computer program compiles the plurality of sales opportunities and defines a sales activity curve for each of the sales associates;
   (b) the computer program processing the sales information;
   (c) the computer program identifying weaknesses of the sales associates based on a respective one of the sales activity curve of each of the associates; and
   (d) the computer program identifying advice content for a manager to manage the sales associates based on the identified weaknesses of the sales associates.

15. A sales management system comprising:
   means for receiving sales information from a remote computer, the sales information including sales data relating to a status of a plurality of sales opportunities among each of the sales associates, each of the plurality of sales opportunities including multiple phases of a sale, wherein the receiving means compiles the plurality of sales opportunities and defines a sales activity curve for each of the sales associates;
   means for processing the sales information;
   means for identifying weaknesses of the sales associates based on the sales information; and
   means for identifying advice content based on the identified weaknesses of the sales associates.

* * * * *